(12) United States Patent
Hori et al.

(10) Patent No.: US 6,328,127 B1
(45) Date of Patent: Dec. 11, 2001

(54) OPERATING LEVER DEVICE

(75) Inventors: Shuuji Hori; Yasuhiro Sato, both of Oyama; Naoki Ishizaki, Tochigi; Masayoshi Mototani, Oyama, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/561,987

(22) Filed: May 2, 2000

(30) Foreign Application Priority Data

May 6, 1999 (JP) .................................................. 11-125967
Oct. 27, 1999 (JP) .................................................. 11-305983

(51) Int. Cl.⁷ .............................. B60K 26/00; G05G 5/06
(52) U.S. Cl. ...................................... 180/333; 74/471 XY
(58) Field of Search ..................................... 180/315, 332, 180/333, 334, 6.2, 6.32, 6.48; 74/471 XY; 477/1

(56) References Cited

U.S. PATENT DOCUMENTS

| | | | | |
|---|---|---|---|---|
| 3,401,574 | * | 9/1968 | Doolittle | ...................... 74/471 XY |
| 3,978,738 | * | 9/1976 | Naulin | ............................. 74/471 XY |
| 4,076,090 | * | 2/1978 | Krusche et al. | .................... 180/6.48 |
| 5,285,861 | * | 2/1994 | Nakamura | ........................... 180/6.44 |
| 6,098,481 | * | 8/2000 | Mills et al. | ..................... 74/471 XY |

* cited by examiner

Primary Examiner—J. J. Swann
Assistant Examiner—David R. Dunn
(74) Attorney, Agent, or Firm—Varndell & Varndell, PLLC

(57) ABSTRACT

A vehicle advances forward while turning to the right when an operating lever is tilted forward and to the right, that is, being operated in a direction intermediate between the forward direction and right-hand direction. Only an output signal of the component corresponding to the forward direction is preserved when the operating lever is released. The component corresponding to the right-hand direction returns to the neutral position, and the signal output is brought to zero. The vehicle therefore moves only forward. The operating position can thus be preserved and a signal output state can be held for a single directional component selected from longitudinal and transverse direction components when operating the operating lever device which is tilted along the directional components in both longitudinal and transverse directions.

9 Claims, 21 Drawing Sheets

FIG.21

OPERATING LEVER DEVICE

BACKGROUND OF THE INVENTION

1. Field of the Invention

The present invention relates to an operating lever device, and more particularly to an operating lever device capable of retaining output signals of an operating lever.

2. Description of the Related Art

There are already inventions concerning operating lever devices for generating an operating signal by the tilting of a single operating lever, and driving two hydraulic actuators in a controlled manner on the basis of this operating signal.

For example, Japanese Patent Application Laid-open No. 9-89515 discloses an electric operating lever device for outputting displacement as an electrical signal to each of four pistons by tilting an operating lever. Two hydraulic actuators can be driven in a controlled manner on the basis of electrical signals outputted by this electric operating lever device.

In addition, the international publication No. WO96/15374 discloses a hydraulic operating lever device for outputting hydraulic signals.

FIG. 12(a) depicts a fragmentary cross section of a hydraulic operating lever device. Displacement is outputted as an electrical signal to each of four pistons by tilting an operating lever.

FIG. 12(b) is a perspective view depicting the structure of the universal joint 50 shown in FIG. 12(a). Two hydraulic motors mounted on a hydraulically driven vehicle are driven in a controlled manner by the operating lever device in FIGS. 12(a) and 12(b). In addition, FIGS. 13(a) and 13(b) show the manner in which the operating lever shown in FIGS. 12(a) and 12(b) is moved around. A description will now be given with reference to these drawings.

The operating lever device 5 shown in FIG. 12(a) primarily comprises a device unit 7 and an operating lever 6 tiltably provided to the device unit 7.

The operating lever 6 is mounted on the device unit 7 through the agency of a universal joint 50 and a disk plate 8.

As shown in FIGS. 13(a) and 13(b), four pistons 1, 2, 3, and 4 are provided such that piston tips (tops) project from a mounting plate 11. Viewed from above the mounting plate 11, the pistons 1, 2, 3, and 4 are arranged in the four corners of a square. The vehicle is propelled forward by the tilting of the operating lever 6 in the F-direction and pushing down the piston 4. The vehicle is propelled backward by the tilting of the operating lever 6 in the B-direction and pushing down the piston 2. The vehicle is caused to spin-turn to the right by the tilting of the operating lever 6 in the R-direction and pushing down the piston 1. The vehicle is caused to spin-turn to the left by the tilting of the operating lever 6 in the L-direction and pushing down the piston 3. As used herein, "spin-turn" is occasionally referred to as pirouetting. This is a movement in which a vehicle turns while the center of the vehicle remains stationary. In more-specific terms, this is an operation in which a turn is performed by causing the wheels or tracks provided to the vehicle to rotate at the same speed but in mutually opposite directions.

FIG. 12(a) is a cross section of FIG. 13(a), as viewed from the left.

A two-pronged bracket 12 is mounted on the device unit 7. As shown in FIG. 12(b), the universal joint 50 comprises the two-pronged bracket 12, a tilting bridge member 13, a support shaft 9, and a support shaft 10. The tilting bridge member 13 is provided to the two-pronged bracket 12 through the agency of the support shaft 10. The operating lever 6 is provided to the tilting bridge member 13 through the agency of the support shaft 9. Specifically, the operating lever 6 is mounted on the device unit 7 through the agency of the universal joint 50.

The support shaft 9 of the universal joint 50 is provided such that the axis thereof is orthogonal to the axis of the support shaft 10.

The support shaft 9 is parallel to the upper surface of the mounting plate 11 and is at a right angle to the plane of paper. The support shaft 9 supports the operating lever 6 while allowing it to rotate about the support shaft 9. Specifically, the operating lever 6 can be tilted to the right and left in FIG. 12(a) by being rotated about the support shaft 9.

The support shaft 10 is parallel to the upper surface of the mounting plate 11 and is at a right angle to the aforementioned support shaft 9. The support shaft 10 supports the tilting bridge member 13 in the two-pronged bracket 12 while allowing the member to rotate about the support shaft 10. Specifically, the operating lever 6 can be tilted in the direction orthogonal to the plane of paper in FIG. 12(a) by being rotated together with the tilting bridge member 13 about the support shaft 10.

Adopting this configuration for the universal joint 50 allows the operating lever 6 to be tilted in relation to the device unit 7 in two directions at right angles to each other.

The disk plate 8 is mounted on the operating lever 6 such that the tips (tops) of the pistons 1, 2, 3, and 4 come into contact with the lower surface of the plate.

The pistons 2 and 4 can therefore be displaced in accordance with the direction and amount of tilt of the operating lever 6. Although this is not shown in FIG. 12(a), the same applies to the pistons 1 and 3.

The device unit 7 is equipped with hydraulic signal generation means for generating hydraulic signals whose magnitude corresponds to piston displacement for each of the four pistons 4, 2, 1, and 3. The pistons 4, 2, 1, and 3 correspond to pilot ducts 14, 15, 16, and 17, respectively (see FIG. 13(b)).

The operation of the above-described operating lever device 5 will now be described.

FIG. 12(a) depicts the operating lever 6 in the neutral position. From this state, the operating lever 6 is tilted (to the left in the drawing) about the support shaft 9. When this is done, the piston 4 on the left side of the drawing is pressed down in the direction of arrow A through the agency of the disk plate 8.

When the piston 4 is depressed, the pilot duct 14 outputs a hydraulic pilot pressure $P_p$ whose magnitude is proportional to the amount of tilt of the operating lever 6. Similarly, hydraulic signals indicating pilot pressure $P_p$ are outputted from the pilot ducts 15, 16, and 17 when the pistons 2, 1, and 3 are displaced in accordance with the tilt of the operating lever 6.

FIGS. 10 and 11 depict two main types of operating pattern concerning the relation between the direction of tilt of the operating lever 6 and the direction of travel of the vehicle.

FIG. 10 is an operating pattern, primarily for a vehicle such as a skid steer loader. The arrows in the drawing indicate the directions in which the vehicle is caused to travel in accordance with the direction of tilt of the operating lever 6.

It is assumed here that the operating lever 6 is tilted forward (rectilinearly) from the neutral position in the F-direction, as shown in FIG. 10.

At this time, the piston 4 alone is displaced in the operating lever device 5. Consequently, a hydraulic signal $P_p$ is outputted from the pilot duct 14 alone. A hydraulic actuator (not shown) operates in accordance with the hydraulic signal $P_p$, propelling the vehicle forward (rectilinearly).

As shown in FIG. 10, the vehicle is propelled backward (rectilinearly) when the operating lever 6 is tilted backward in the B-direction. In addition, the vehicle is caused to make a right spin-turn (pirouette) when the operating lever 6 is tilted in the R-direction, which corresponds to a right spin-turn (pirouette). The vehicle is caused to make a left spin-turn (pirouette) when the operating lever 6 is tilted in the L-direction, which corresponds to a left spin-turn (pirouette). Tilting the operating lever 6 in a direction intermediate between the F-direction and R-direction will cause the vehicle to turn right while moving forward. Tilting the operating lever 6 in a direction intermediate between the R-direction and B-direction will cause the vehicle to turn right while moving backward. Tilting the operating lever 6 in a direction intermediate between the B-direction and L-direction will cause the vehicle to turn left while moving backward. Tilting the operating lever 6 in a direction intermediate between the L-direction and F-direction will cause the vehicle to turn left while moving forward.

FIG. 11 is an operating pattern, primarily for a vehicle such as a bulldozer.

As shown in FIG. 11, the vehicle is propelled forward (rectilinearly) when the operating lever 6 is tilted forward in the F-direction. In addition, the vehicle is propelled backward (rectilinearly) when the operating lever 6 is tilted backward in the B-direction. The vehicle stops when the operating lever 6 is tilted right in the R-direction. The vehicle stops when the operating lever 6 is tilted left in the L-direction. Tilting the operating lever 6 in a direction intermediate between the F-direction and R-direction will cause the vehicle to turn right while moving forward. Tilting the operating lever 6 in a direction intermediate between the R-direction and B-direction will cause the vehicle to turn left while moving backward. Tilting the operating lever 6 in a direction intermediate between the B-direction and L-direction will cause the vehicle to turn right while moving backward. Tilting the operating lever 6 in a direction intermediate between the L-direction and F-direction will cause the vehicle to turn left while moving forward.

In the conventional operating lever 6 depicted in FIGS. 12(a) and 12(b), the pistons press on the disk plate 8 with the spring force of return springs 43 and 44, and the operating lever 6 automatically returns to the neutral position when the operator moves the lever to the prescribed operating position and then releases the lever.

The requirement in this case is that the vehicle continue moving even when the operating lever 6 is released. Specifically, the operator may perform various other operations and procedures besides moving the operating lever. It is necessary, however, to maintain the operating lever 6 in a constant state even when other operations are being performed. The operator is under considerable stress because of the need to perform a plurality of operations at the same time. Specifically, it is required that the operating lever 6 be kept in the same operating position to reduce operator stress.

It has been proposed to preserve a tilted position of the operating lever 6 in order to allow a vehicle to continue to travel even when the hand has been removed from the lever.

FIG. 14 depicts an operating lever device 5' capable of automatically maintaining the operating lever 6 in a constant operating position.

The operating lever device 5' depicted in FIG. 14 differs from the operating lever device 5 depicted in FIGS. 12(a) and 12(b) in that the operating lever device 5' can operate only in the longitudinal or transverse direction (for example, longitudinal direction).

In FIG. 14, the operating lever 6 is supported by a support shaft 91 while allowed to tilt solely in a direction parallel to the plane of paper.

A sliding surface 6b of prescribed curvature is formed on the base portion 6a of the operating lever 6. The operating lever device 5' is provided with a brake member 90 having a sliding surface whose shape corresponds to the shape of the sliding surface 6b of the aforementioned operating lever base portion 6a. Depressing the brake member 90 with a rod 92 brings the sliding surface of the brake member 90 and the sliding surface 6b of the operating lever base portion 6a into contact with each other. The other structural elements are the same as in FIG. 12(a), and will therefore be omitted from the description.

FIG. 14 depicts a state in which the operating lever 6 is in a neutral position. Let us assume that the operating lever 6 is tilted from this state forward in the F-direction on the left side of the drawing about the support shaft 91. When this is done, the piston 4 on the left side of the drawing is depressed in the direction of arrow A through the agency of the operating lever base portion 6a.

When the piston 4 is depressed, the pilot duct 14 outputs a hydraulic pilot pressure $P_p$ whose magnitude is proportional to the amount of tilt of the operating lever 6. A hydraulic actuator (not shown) is thereby operated, and the vehicle is propelled forward. A hydraulic signal indicating pilot pressure $P_p$ is outputted by the pilot duct 15, and the vehicle is propelled backward in a similar manner when the piston 2 on the opposite side is displaced in proportion to the tilt of the operating lever 6.

In this case, frictional force based on the sliding resistance between the sliding surface 6b of the operating lever and the brake member 90 overcomes the rotational return force exerted by the return springs 43 and 44, and the operating lever base portion 6a remains in a prescribed rotational position when the operating lever 6 is released by the operator after the lever has been moved to a prescribed operating position and the operating lever base portion 6a rotated to the prescribed rotational position. The operating lever 6 is thus held in the state existing in the prescribed operating position.

The operating lever device depicted in FIG. 14 preserves the signal output state thereof as a result of lever position holding.

The operating lever device 5 depicted in FIG. 12(a) and designed for operation with both directional components (longitudinal and transverse directions) is similar to the operating lever device 5' in FIG. 14 designed for operation with a single directional component in that the requirement is still to preserve the signal output and to reduce operator stress.

When released, however, the operating lever device 5 depicted in FIG. 12(a) automatically returns to the neutral position.

The operator in control of the operating lever device 5 depicted in FIG. 12(a) is required to lock in the operating lever 6 and to preserve the current signal output state only with respect to a single directional component selected from the directional components related to longitudinal and transverse directions.

There are, for example, cases in which the operator needs to move the operating lever 6 in a direction intermediate between the forward direction and the right-hand direction and to drive the vehicle forward while turning it to the right in the manner shown in FIGS. 10 and 11, and to subsequently propel the vehicle forward while preserving the current travel speed.

If it is assumed that the conventional technology illustrated in FIG. 14 is used and the operating lever 6 is released after the vehicle has been propelled forward while being turned to the right, the vehicle will still continue to move forward while turning to the right because the operating lever 6 is held in the operating position achieved at the time of release.

A first object of the present invention is to preserve the operating position and to maintain the correspond signal output state only with respect to one directional component selected from among the directional components of the longitudinal and transverse directions, even when the operating lever is tilted using components of both the longitudinal and the transverse directions.

It should also be noted that the holding function whereby the operating lever is held in a tilted position and the signal output state thereof is preserved sometimes needs to be canceled in certain operating situations.

An arrangement in which the operating lever is held in a tilted position has the following disadvantages.

Let us assume that the engine has stopped with the operating lever held in a tilted position. When the engine is restarted in this state, the vehicle is jolted forward in accordance with the tilting direction of the operating lever.

A second object of the present invention is to make it possible to cancel the holding function whereby the operating lever is held in a tilted position and the signal output state thereof is preserved.

SUMMARY OF THE INVENTION

Aimed at attaining the first object, the first invention of the present invention resides in an operating lever device which comprises an operating lever (6) tiltable in an arbitrary longitudinal or transverse tilting direction in two dimensions; and drive signal generation means (20, 19, 21, 18) for generating a drive signal in accordance with a direction and an amount of tilt of the operating lever (6), and outputting the generated drive signal to two actuators, and which further comprises output holding means for holding an output of the drive signal corresponding to a directional component selected from the longitudinal and transverse direction components of the tilted direction existing prior to cancellation of the tilting operation when the tilting operation of the operating lever (6) is canceled.

According to the first invention, the drive signal output of a longitudinal or transverse direction component is preserved unchanged as a pre-cancellation component by output holding means when the operating lever 6 is released in an arbitrary tilted position and the tilting operation is canceled.

The first invention will be described with reference to a case in which the arrangement for holding a signal output in the longitudinal direction is provided to a vehicle.

The vehicle performs a right forward turn while moving forward and to the right when the operating lever 6 is tilted forward and to the right, that is, in a direction intermediate between the forward F-direction and right-hand R-direction. In this state, the signal output of the forward direction component F alone is preserved when the operating lever 6 is released. The right-hand direction component R returns to the neutral position, and the signal output becomes zero. Consequently, the vehicle moves forward.

The second invention is obtained by modifying the first invention such that the output holding means is output holding means (48c) for holding the operating lever (6) in the tilted position of a directional component selected from longitudinal and transverse direction components when the operating lever (6) is tilted.

The second invention will now be described with reference to FIGS. 1, 2, and 3.

According to the second invention, the operating lever 6 is held in the tilted position of a directional component selected from longitudinal direction components F and B and transverse direction components L and R when this operating lever 6 is tilted.

Specifically, the operating lever 6 is held in the tilted position of the forward direction component F when the operating lever 6 is shifted in a direction intermediate between the forward direction F and the right-hand direction R to move the vehicle forward while turning it to the right, and the operating lever 6 is then released, as shown in FIGS. 10 and 11. The right-hand direction component R alone is returned to the neutral position. The vehicle therefore moves directly forward at the current travel speed thereof. The second invention thus allows the signal output of a single directional component to be preserved by holding the operating lever 6.

The third invention resides in an operating lever device which comprises an operating lever (6) tiltable in an arbitrary longitudinal or transverse tilting direction in two dimensions; a longitudinally rotating shaft (52) rotating in accordance with the tilting of the operating lever (6) along a longitudinal direction component; a transversely rotating shaft (53) rotating in accordance with the tilting of the operating lever (6) along a transverse direction component; and drive signal generation means (20, 19, 21, 18) for generating a drive signal in accordance with a direction and an amount of tilt of the operating lever (6), and outputting the generated drive signal to two actuators, and which further comprises holding means (48c) for holding the operating lever (6) in the tilted position of a directional component selected from longitudinal and transverse direction components by generating a sliding resistance in the longitudinally rotating shaft (52) or transversely rotating shaft (53) when the operating lever (6) is tilted.

The third invention will now be described with reference to FIGS. 1, 2, and 3.

According to the third invention, the operating lever 6 is held in the tilted position of a directional component F or B selected from longitudinal direction components F and B and transverse direction components when this operating lever 6 is tilted. In this case, the operating lever 6 is held in the tilted position of a directional component F or B selected from the longitudinal direction components F and B and transverse direction components L and R by allowing the sliding member 48c to generate sliding resistance in a rotating shaft 52 selected from a longitudinally rotating shaft 52 and a transversely rotating shaft 53.

According to the third invention, the operating lever 6 is held in the tilted position of the forward direction component F when the operating lever 6 is shifted in a direction intermediate between the forward direction F and the right-hand direction R to move the vehicle forward while turning it to the right, and the operating lever 6 is then released, as shown in FIGS. 10 and 11. The vehicle therefore moves directly forward at the current travel speed thereof. The third invention thus allows the operating lever 6 to be held in place.

Another feature of the third invention is that a simple structure is involved because holding force is produced by providing a sliding member 48c to a rotating shaft 52 selected from a longitudinally rotating shaft 52 and a transversely rotating shaft 53, which are the structural members for tilting the operating lever 6.

The fourth invention is obtained by providing the first invention with neutral position signal generation means (57) for generating a signal indicating that the operating lever (6) is in a neutral position when at least one directional component selected from the longitudinal and transverse direction components of the operating lever (6) is in the neutral position.

The fourth invention will now be described with reference to FIGS. 1, 2, and 3.

The fourth invention has the same merits as the first invention.

The fourth invention also makes it possible to monitor the neutral position of the operating lever 6 with the neutral position signal generation means.

When the operating lever device 5 is in the neutral position, a drive signal cannot be outputted, so the vehicle cannot be driven, or a state is established in which the vehicle cannot be driven by a signal indicating a neutral position.

With the directional component for preserving the drive signal output, there is no automatic return of the operating lever 6 to the neutral position. Because of the need to perform operations aimed at returning the operating lever 6 to the neutral position, the operator cannot easily determine the exact location of the neutral position.

According to the fourth invention, the operator can determine that a state in which there is no drive signal output has been established based on the generation of a neutral position signal. When a traction vehicle is provided with this arrangement, it can be easily distinguished based on the presence or absence of a neutral position signal thus generated whether the travel speed component of the vehicle is very small or nonexistent.

With a directional component for which the drive signal output is not preserved, the operating lever 6 is automatically returned to the neutral position, allowing the operator to accurately determine that the neutral position has been regained.

The neutral position signal generated by the neutral position signal generation means is a signal capable of transmitting variations in the operating force to the operating lever 6 when the operating lever 6 is shifted to the neutral position, for example. The neutral position signal may also be generated as an electrical signal, hydraulic signal, or the like to indicate that the neutral position has been reached.

The fifth invention is obtained by modifying the fourth invention such that the neutral position signal generation means (57) are operating force varying means (54) for varying the operating force of the operating lever (6).

The fifth invention will now be described with reference to FIGS. 1, 2, and 3.

The fifth invention has the same merits as the fourth invention.

When the operating lever 6 is shifted along a directional component F or B, it is held in the tilted position corresponding to the directional component F or B without being automatically returned to the neutral position. There is, therefore, no need for the operator to manually return the operating lever 6 to the neutral position.

According to the fifth invention, the operating force of the operating lever 6 is varied by the operating force varying means 54 when the operating lever 6 is moved to the neutral position by being operated along the directional component F or B, which represents the holding direction of the operating lever 6. Based on the variations in the operating force of the operating lever 6, the operator can determine that the lever is in the neutral position. As a result, it is unnecessary for the operator to visually follow the operating lever 6 or to monitor the movements of running gear or processing machinery to ascertain that the operating lever 6 is indeed in the neutral position when the lever is manually returned to the neutral position. In addition, operator stress is reduced because there is no need to concentrate on the operation of the operating lever 6.

The sixth invention is obtained by modifying the fourth invention such that the neutral position signal generation means (57) generates the neutral position signal when both the longitudinal and transverse direction components of the operating lever (6) are in the neutral position, and comprises means for allowing a drive source (32) to be started in accordance with this neutral position signal.

The sixth invention will now be described with reference to FIGS. 1, 2, and 3.

When the operating lever 6 is operated along the directional component F or B, which represents the holding direction of the operating lever 6, the operating signal of this directional component F or B is preserved at the same level as the tilted position, and there is no automatic return to the neutral position. The operator must therefore manually return the operating lever 6 to the neutral position.

Let us assume that the operating lever 6 is used to drive a traction actuator or an actuator for processing equipment in a controlled manner. In this case, starting the engine or another drive source in a state in which the operating lever 6 is in a position other than the neutral position might jolt the running gear or processing equipment or cause another unintended action.

According to the sixth invention, a neutral position signal indicating that the neutral position has been reached is generated by the neutral position detection switch 57 when the neutral position has been reached by operating the operating lever 6 along the directional component F or B, which represents the holding direction of the operating lever 6. It is only when this neutral position signal is generated that the drive source can be started. The drive source cannot be started unless such a neutral position signal has been generated.

As a result, it is possible to avoid situations in which a vehicle or processing machinery is inadvertently jolted by the operator, who starts the drive source despite the fact that the operating lever 6 has not yet returned to the neutral position. Specifically, the vehicle is prevented from being jolted in the direction of travel corresponding to the tilting direction of the operating lever 6 when the engine 32 is stopped while the operating lever 6 is held in a tilted position, and the engine 32 is then restarted in this state.

Aimed at attaining the second object, the seventh invention is obtained by providing the first invention with output hold canceling means for canceling the output holding state imposed by the output holding means.

The seventh invention will now be described with reference to FIG. 18, which depicts a specific example.

According to the seventh invention, the operating lever 6 is held in the tilted position of a directional component selected from longitudinal direction components F and B and transverse direction components L and R when this operating lever 6 is tilted. Specifically, pressure oil discharged from the operating lever pump 22 acts on the piston 74. Pushing pressure is therefore created by the piston 74, and the sliding member 48c is pressed against the support shaft 52. As a result, the operating lever 6 is held in the tilted position.

Specifically, the operating lever 6 is held in the tilted position of the forward direction component F when the operating lever 6 is shifted in a direction intermediate between the forward direction F and the right-hand direction R to move the vehicle forward while turning it to the right, and the operating lever 6 is then released, as shown in FIGS. 10 and 11. The vehicle therefore moves directly forward at the current travel speed thereof.

When the hold canceling lever 76 is moved to the switching position 77b, pressure oil is no longer discharged from the operating lever pump 22 driven by the engine. Consequently, the pressure oil discharged from the operating lever pump 22 no longer acts on the piston 74. For this reason, the piston 74 no longer generates pushing pressure, canceling the state in which the sliding member 48c is pressed against the support shaft 52. As a result, the holding force of the operating lever 6 is released, and the operating lever 6 is allowed to return from the tilted position to the neutral position.

The seventh invention thus allows the above-described function of holding the operating lever in a controllably tilted position to be canceled in accordance with the working state.

The eighth invention is obtained by modifying the seventh invention such that the output hold canceling means (74) cancels the holding force acting on the operating lever (6) in accordance with the stoppage of the drive source (32) for the two actuators.

The eighth invention will now be described with reference to FIG. 17, which depicts a specific example.

According to the eighth invention, the operating lever 6 is held in the tilted position of a directional component F or B selected from longitudinal direction components F and B and transverse direction components L and R when this operating lever 6 is tilted. Specifically, pressure oil discharged from the operating lever pump 22 acts on the piston 74. Pushing pressure is therefore created by the piston 74, and the sliding member 48c is pressed against the support shaft 52. As a result, the operating lever 6 is held in the tilted position.

The operating lever 6 is held in the tilted position of the forward direction component F when the operating lever 6 is shifted in a direction intermediate between the forward direction F and the right-hand direction R to move the vehicle forward while turning it to the right, and the operating lever 6 is then released, as shown in FIGS. 10 and 11. The vehicle therefore moves directly forward at the current travel speed thereof.

When the drive source 32 is stopped, pressure oil is no longer discharged from the operating lever pump 22 connected to the drive source 32 (engine). Consequently, the pressure oil discharged from the operating lever pump 22 no longer acts on the piston 74. For this reason, the piston 74 no longer generates pushing pressure, canceling the state in which the sliding member 48c is pressed against the support shaft 52. As a result, the holding force of the operating lever 6 is released, and the operating lever 6 is allowed to return from the tilted position to the neutral position.

The ninth invention is obtained by further providing the second invention with return means (43, 44) for holding the operating lever (6) in the tilted position of a directional component selected from longitudinal and transverse direction components by the output holding means (48c) when the operating lever (6) has been tilted, and returning the tilted position of the other directional component to the neutral position.

The ninth invention will now be described with reference to FIGS. 1, 2, and 3.

According to the ninth invention, the operating lever 6 is held in the tilted position of a directional component selected from longitudinal direction components F and B and transverse direction components R and L when this operating lever 6 is tilted. In this case, the operating lever 6 is held in the tilted position of a directional component F or B selected from longitudinal direction components F and B and transverse direction components L and R for a rotating shaft selected from a longitudinally rotating shaft 52 and a transversely rotating shaft 53. The other directional components of the operating lever 6 are automatically returned to the neutral position from the tilted position by the return means 43 and 44.

According to the ninth invention, the operating lever 6 is held in the tilted position of the forward direction component F when the operating lever 6 is shifted in a direction intermediate between the forward direction F and the right-hand direction R to move the vehicle forward while turning it to the right, and the operating lever 6 is then released, as shown in FIGS. 10 and 11. Meanwhile, the right-hand direction component R of the operating lever 6 is automatically returned to the neutral position from the tilted position. The vehicle therefore moves directly forward at the current travel speed thereof.

Thus, the ninth invention is configured such that when the operating lever device 5 is tilted along two directional components in the longitudinal direction F, B and the transverse direction L, R, one directional component can be held in the tilted position while the other directional component can be automatically returned to the neutral position.

The tenth invention is obtained by further providing the second invention with holding force adjustment means (89) for adjusting the magnitude of the holding force acting on the operating lever (6).

The tenth invention will be described with reference to FIG. 21.

The tenth invention has the same merits as the second invention.

Another feature of the tenth invention is that the magnitude of the holding force acting on the operating lever 6 is adjusted by holding force adjustment means 89.

For this reason, the tenth invention allows the magnitude of the holding force acting on the operating lever 6 to be adjusted in accordance with the working state or the operating force of the operator. The holding force can be canceled by being adjusted to zero. This arrangement yields the same merits as the seventh invention.

The eleventh invention is obtained by modifying the first invention such that the drive signal generation means (20, 19, 21, 18) are drive signal generation means (20, 19, 21, 18) for generating a drive signal to propel a vehicle at a travel speed proportional to the amount of tilt of the operating lever (6) in the direction of travel corresponding to the tilting direction of the operating lever (6), and outputting the result to two traction actuators (35, 37).

The eleventh invention will be described with reference to FIGS. 8(a) and 8(b).

The eleventh invention has the same merits as the first invention.

According to the eleventh invention, shifting the operating lever 6 generates a drive signal for propelling a vehicle at a travel speed proportional to the amount of tilt of the operating lever 6 in the direction of travel corresponding to the tilting direction of the operating lever 6, and outputs the result to the two traction actuators 35 and 37.

Specifically, either of the two traction actuators 35 and 37 (actuator 35 or 37) and a corresponding drive direction (forward direction or backward direction) are made to correspond to each of the four pistons 1, 2, 3, and 4 for the operating lever device 5.

When drive signals are generated by each of the four pistons 1, 2, 3, and 4 in the drive signal generation means 20, 19, 21, and 18, the traction actuators corresponding to the pistons generating these drive signals are driven in the corresponding drive directions by the amount of drive proportional to the drive signals. Specifically, generation of a drive signal by the piston 1 causes the traction actuator 35 corresponding to the piston 1 generating this drive signal to be driven in the corresponding drive direction (forward direction) by an amount of drive proportional to this drive signal. When a drive signal is generated by the piston 2, the traction actuator 37 corresponding to the piston 2 generating this drive signal is driven in the corresponding drive direction (backward direction) by an amount of drive proportional to this drive signal. When a drive signal is generated by the piston 3, the traction actuator 35 corresponding to the piston 3 generating this drive signal is driven in the corresponding drive direction (backward direction) by an amount of drive proportional to this drive signal. When a drive signal is generated by the piston 4, the traction actuator 37 corresponding to the piston 4 generating this drive signal is driven in the corresponding drive direction (forward direction) by an amount of drive proportional to this drive signal.

The operating lever 6 is held in the tilted position of a directional component selected from longitudinal direction components F and B and transverse direction components L and R by the operating lever 6. As a result, it is possible to preserve a state in which the traction actuator corresponding to the directional component is driven in the corresponding drive direction.

The eleventh invention thus allows the operating lever 6 to be held in the tilted position of the forward direction component F when the operating lever 6 is shifted in a direction intermediate between the forward direction F and the right-hand direction R to move the vehicle forward while turning it to the right, and the operating lever 6 is then released, as shown in FIG. 10 by way of a specific example. The vehicle therefore moves forward while preserving its current travel speed.

BRIEF DESCRIPTION OF THE DRAWINGS

FIG. 21 is a diagram depicting the structure of a fifth example of the lever unlocking device;

DESCRIPTION OF THE PREFERRED EMBODIMENTS

Embodiments of the operating lever device pertaining to the present invention will now be described with reference to drawings. The embodiments are described on the assumption that an actuator drive device is mounted on a vehicle, and vehicle travel is drivably controlled by the movement of an operating lever.

Figure 1A:
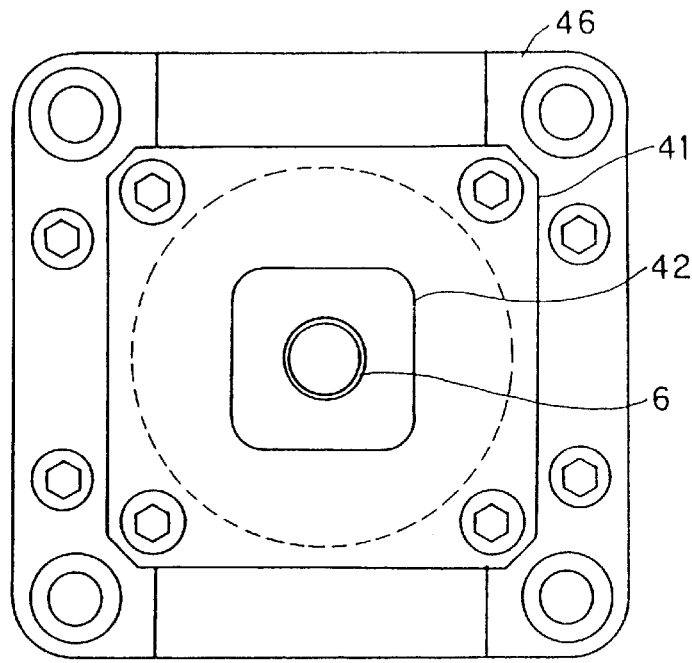
FIGS. 1(a) and 1(b) are block diagrams of an operating lever device according to a first embodiment.
Figure 1B:
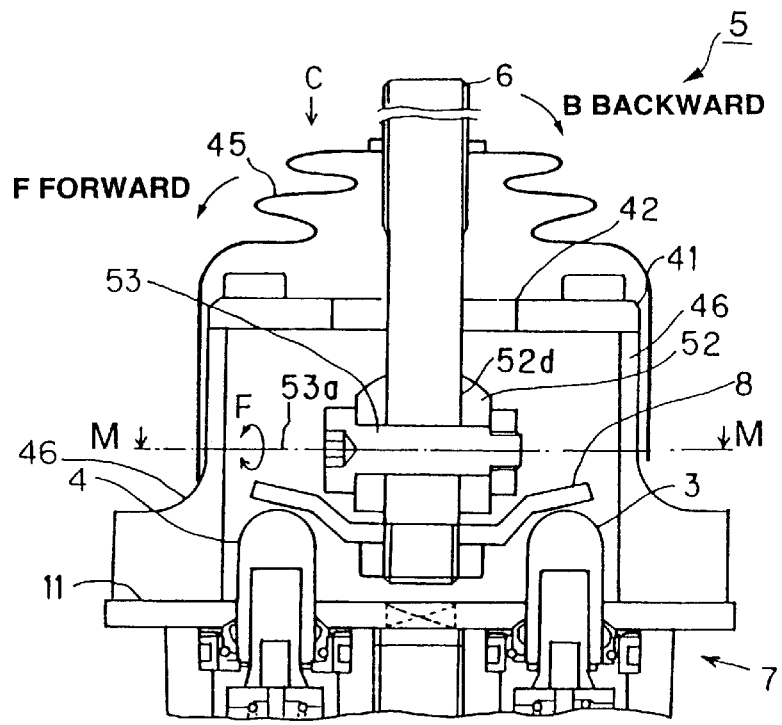
Figure 2A:
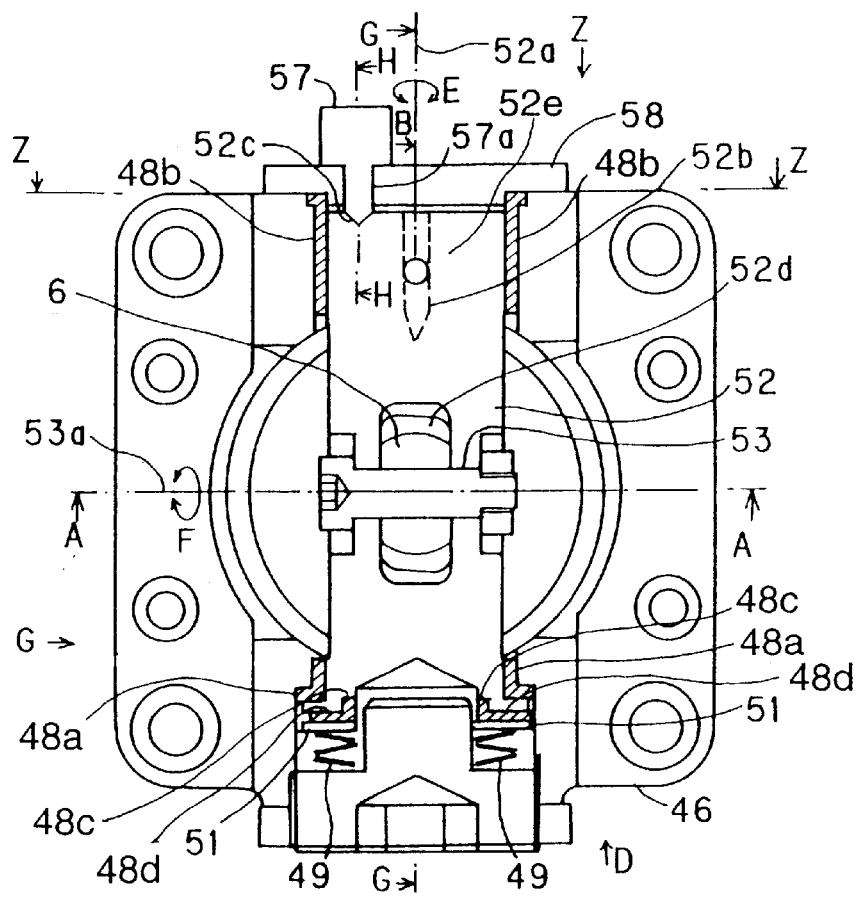
FIGS. 2(a), 2(b), and 2(c) are block diagrams of the operating lever device according to the first embodiment.

The structure of an operating lever device 5 in accordance with a first embodiment is shown in FIGS. 1, 2, and 3. FIG. 1(a) is a top view of FIG. 1(b) in the direction of arrow C. FIG. 1(b) is cross section A—A of FIG. 2(a). FIG. 1(b) is a cross section of FIG. 7(a), as viewed from the left.

As can be seen in FIGS. 1(a) and 1(b), the operating lever device 5 primarily comprises a device unit 7 and an operating lever 6. The operating lever 6 can be tilted in relation to the device unit 7. The operating lever 6 is mounted on the device unit 7 through the agency of a disk plate 8 and support shafts 52 and 53, which function as a universal joint.

The difference from the operating lever device 5 depicted in FIG. 12 is that the support shaft 52, which is a shaft rotating in the longitudinal direction, is allowed to develop sliding resistance. Following is a description of structural differences.

Figure 7A:
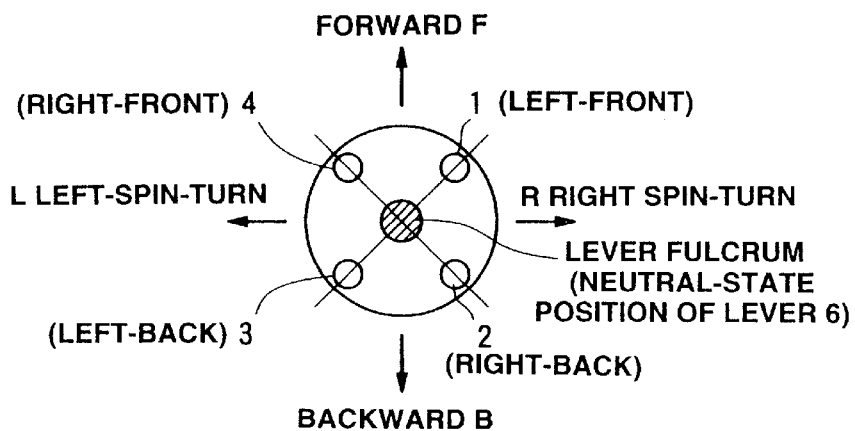
FIGS. 7(a) and 7(b) are diagrams illustrating the movement of the operating lever.
Figure 7B:
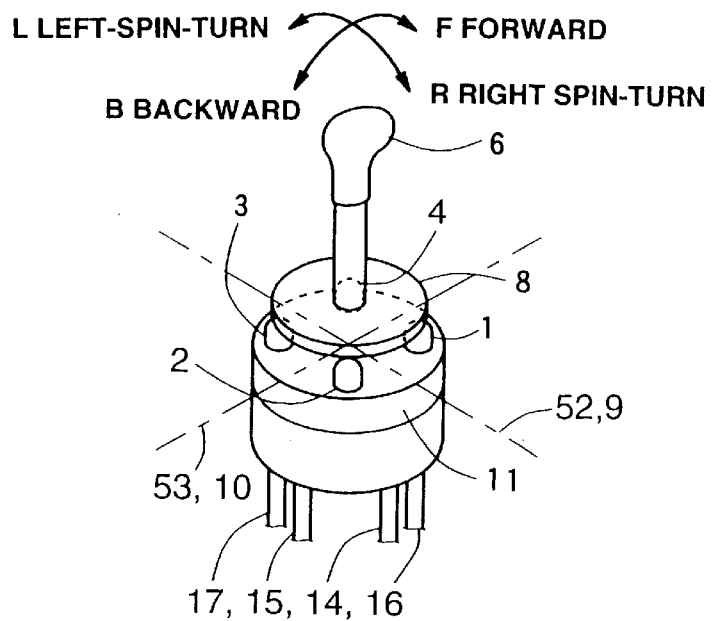
Figure 13A:
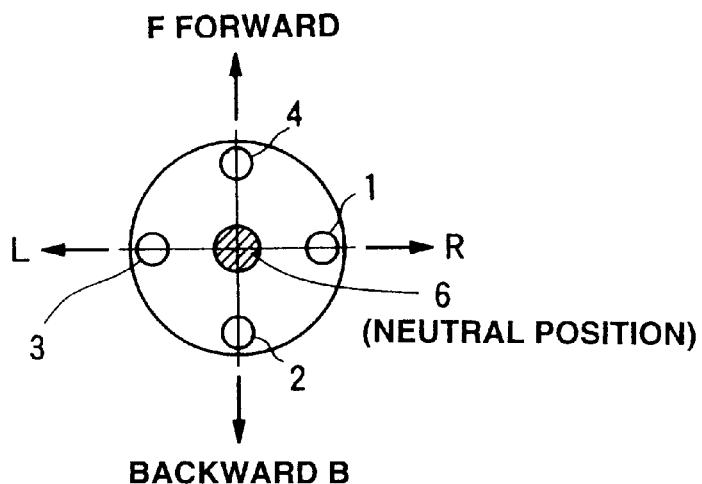
FIGS. 13(a) and 13(b) are diagrams illustrating the movement of the conventional operating lever.
Figure 13B:
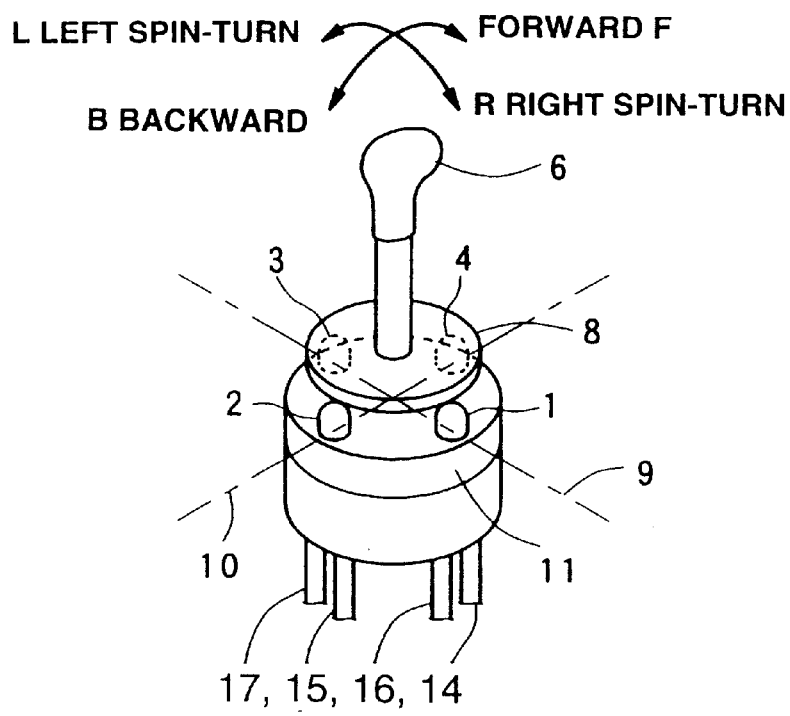
Figure 14:
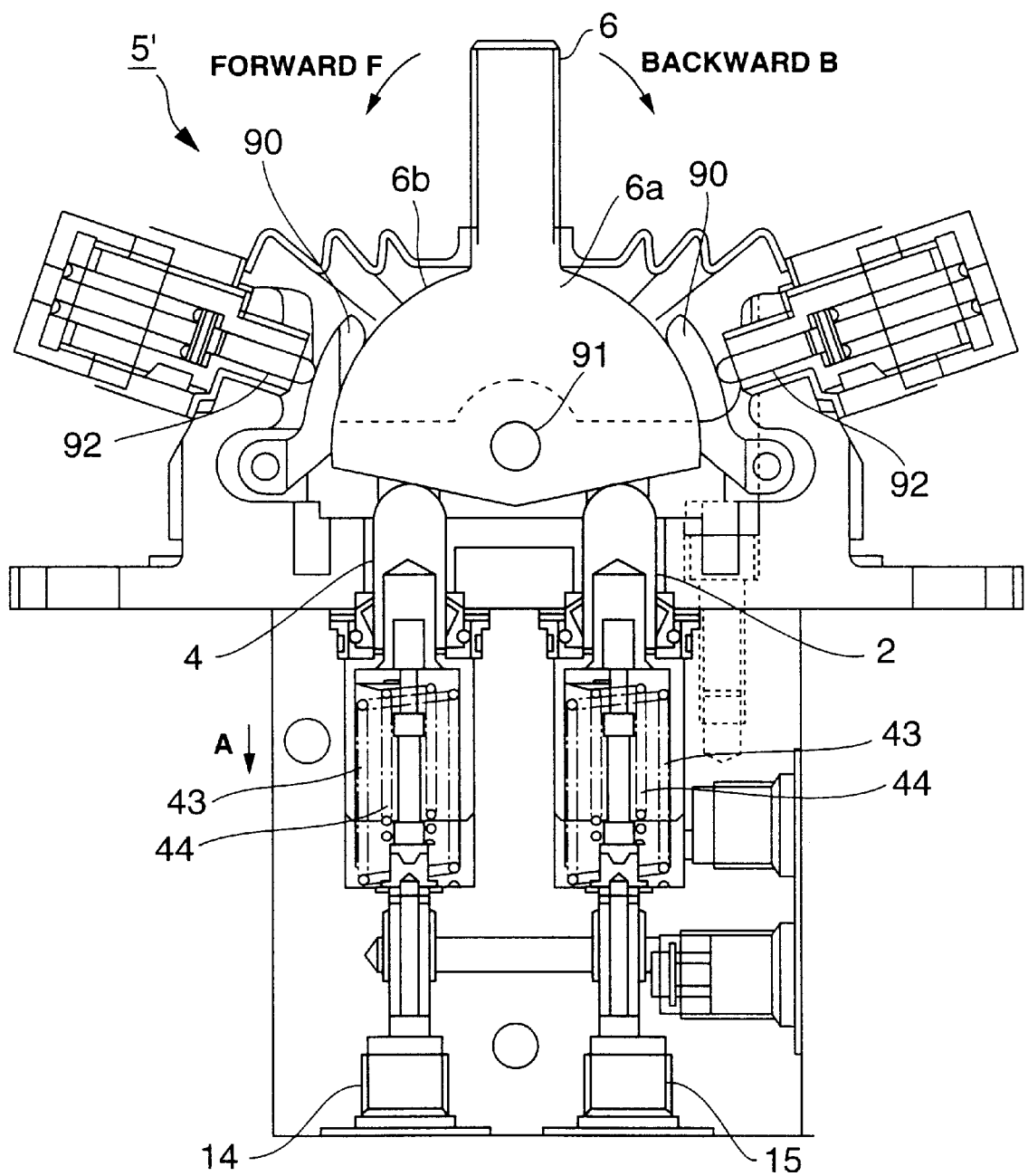
FIG. 14 is a cross section depicting the structure of a conventional operating lever device.

FIGS. 7(a) and 7(b) of this embodiment correspond to FIGS. 13(a) and 13(b) of prior art.

Specifically, four pistons 1, 2, 3, and 4 are provided such that the tips (tops) of the pistons extend from a mounting plate 11. Viewed from the lever fulcrum 6e, the pistons 1, 2, 3, and 4 are disposed while shifted 45° in relation to the support shafts 52 and 53, which correspond to the support shafts 9 and 10 depicted in FIG. 13(b). The quadrangle formed by the pistons 1, 2, 3, and 4 need not be a perfect square. The piston 1 is located in the right-upper position, the piston 2 in the right-lower position, the piston 3 in the left-lower position, and the piston 4 in the left-upper position.

A casing 46 is mounted on the mounting plate 11 of the device unit 7, as shown in FIGS. 1(a) and 1(b). The casing 46 houses the disk plate 8 and the support shafts 52 and 53.

A guide member 41 designed to restrict the tilting of the operating lever 6 is provided to the top of the casing 46. A quadrangular guide 42 is formed in the guide member 41. The operating lever 6 passes through the guide 42 of the guide member 41. A lever shaft stretching between the knob of the operating lever 6 and the disk plate 8 can be pressed against the guide 42. With this arrangement, it is possible to obtain sensory feedback indicating that the tip of the operating lever 6 is moving horizontally in a straight line as a result of the fact that, for example, the operating lever 6 is tilted forward in the F-direction, pressed against the guide 42, and moved along this guide 42.

Figure 6:
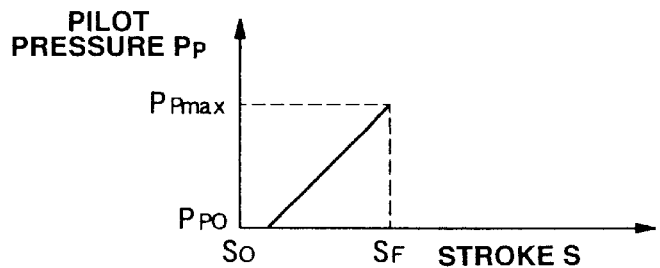
FIG. 6 is a diagram depicting the relation between the stroke and hydraulic signal of the operating lever.

When the operating lever 6 is tilted until it is pressed against the guide 42, a displacement signal $P_{pmax}$ of optimum output $P_{pmax}$ is outputted by the operating lever device 5, as shown in FIG. 6.

The cover 45 shown in FIG. 1(b) is placed over the guide 42 in order to prevent dust and other types of foreign matter from penetrating from outside into the casing 46 through the guide 42.

Figure 2C:
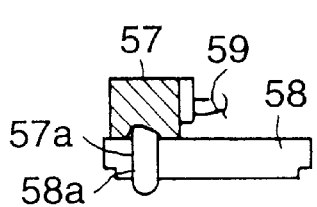
Figure 2B:
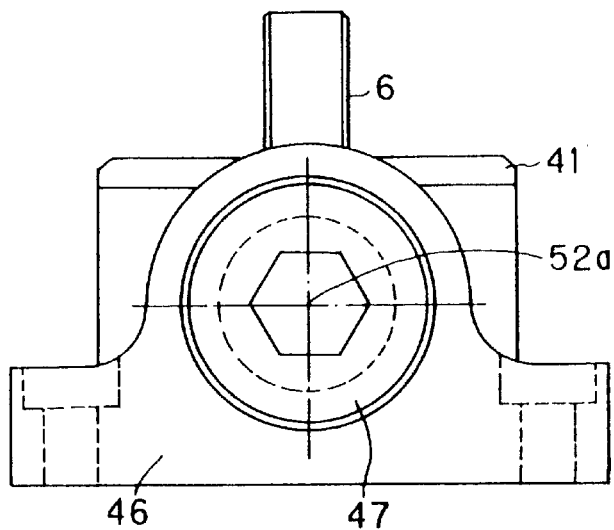

FIG. 2(a) is a cross section along M—M in FIG. 1(b). FIG. 2(b) is a longitudinal section of FIG. 2(a) in the direction of arrow D. FIG. 2(c) is a cross section along H—H in FIG. 2(a).

As shown in FIG. 2(a), the casing 46 is provided with sliding members 48a and 48b for covering part of the outer peripheral cylindrical surface 52e of the substantially columnar support shaft 52. The support shaft 52 is a longitudinally rotating shaft rotating in accordance with the tilt of the operating lever 6 along the longitudinal direction components F and B. The support shaft 52 is provided to the casing 46 while allowed to rotate about a center axis 52a. Consequently, sliding resistance is created between the sliding surfaces of the sliding members 48a and 48b and the outer peripheral surface of the support shaft 52 in contact with these sliding surfaces when the operating lever 6 is along the longitudinal components F and B, and the support shaft 52 is rotated about the center axis 52a, as indicated by arrow E (F and B in the longitudinal direction). Frictional force based on this sliding resistance is applied to the operating lever 6. The operating lever 6 is stopped at a prescribed tilting position as a result of the fact that the frictional force applied to the operating lever 6 acts on the opposite side from the rotational return force exerted by return springs 43 and 44 and applied to the same operating lever 6. The operating lever 6 is therefore held in the prescribed tilting position.

An opening 52d is formed in the center of the support shaft 52. The operating lever 6 passes through this opening 52d. This arrangement restricts rotation of the operating lever 6 about the center axis 52a while allowing the lever to move around the axis orthogonal to the center axis 52a.

The support shaft 52 is provided with a support shaft 53 that is orthogonal to the support shaft 52 and is capable of rotating about a center axis 53a. The support shaft 53 supports the operating lever 6. The support shaft 53 thus functions as a transversely rotating shaft rotating in accordance with the tilt of the operating lever 6 along the transverse direction components L and R.

One end of each flat countersunk head screw 49 is pressed against an end face of the support shaft 52 through the agency of a sliding member 48c and shims 51. Other types of screws may be used instead of the flat countersunk head screws 49. The other ends of the screws 49 are pressed against an adjustment bolt 47 provided to the casing 46. The spring force applied by the screws 49 to the sliding member 48c can thus be varied by rotating the head of the adjustment bolt 47 and adjusting the screw-in position thereof in relation to the casing 46. The pressure on the support shaft 52 of the sliding member 48c can thus be varied. This varies the sliding resistance between the sliding surface 48d of the sliding member 48c and the outer peripheral surface of the support shaft 52 in contact with the sliding surface 48d. The force for holding the operating lever 6 in a tilted position can therefore be varied.

A neutral position sensing groove 52c is formed in the end face opposite from the end face of the support shaft 52 on the side urged by the screws 49. A side plate 58 is also provided to the casing 46, and the side plate 58 is provided with a neutral position detection switch 57 as a means for generating neutral position signals. The neutral position detection switch 57 is provided with a rod 57a capable of being extended or retracted through the agency of a spring or the like.

The rod 57a is inserted into a hole 58a in the side plate 58, as shown in FIG. 2(c). The tip of the rod 57a of the neutral position detection switch 57 fits into the groove 52c in the support shaft 52 when the operating lever 6 is in the neutral position.

The rod 57a is extended when the operating lever 6 is in the neutral position and the tip of the rod 57a of the neutral position detection switch 57 fits into the groove 52c in the support shaft 52. When the rod 57a is extended, an electrical signal indicating the neutral position is outputted by the neutral position detection switch 57 through an electrical signal line 59.

Figure 3A:
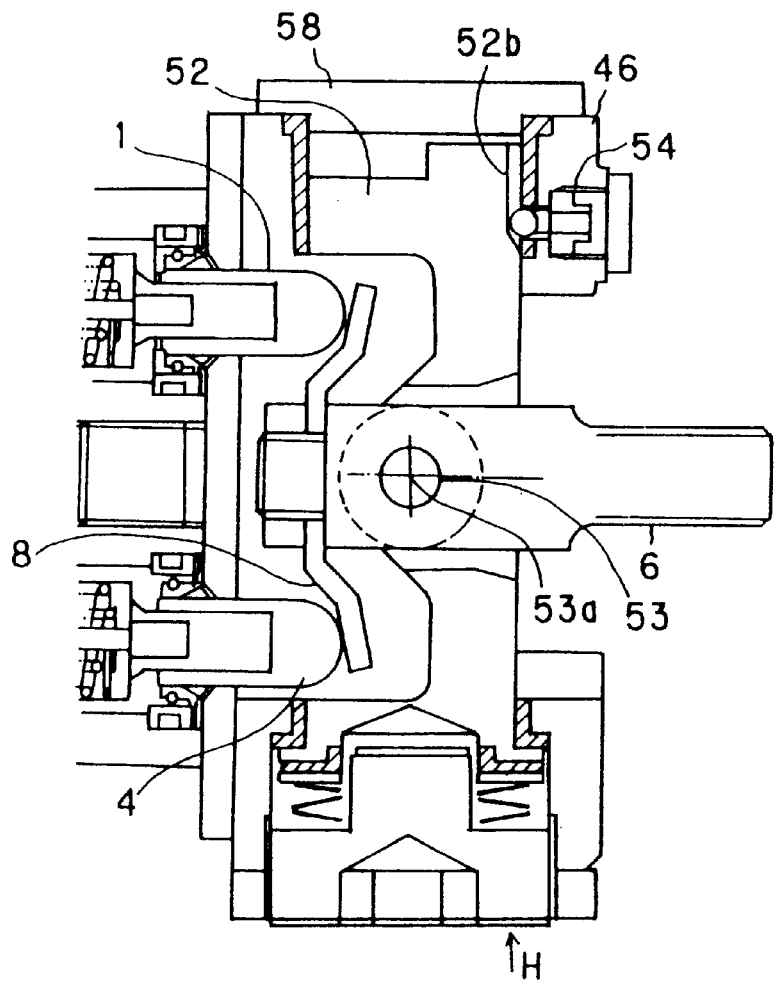
FIGS. 3(a) and 3(b) are block diagrams of the operating lever device according to the first embodiment.
Figure 3B:
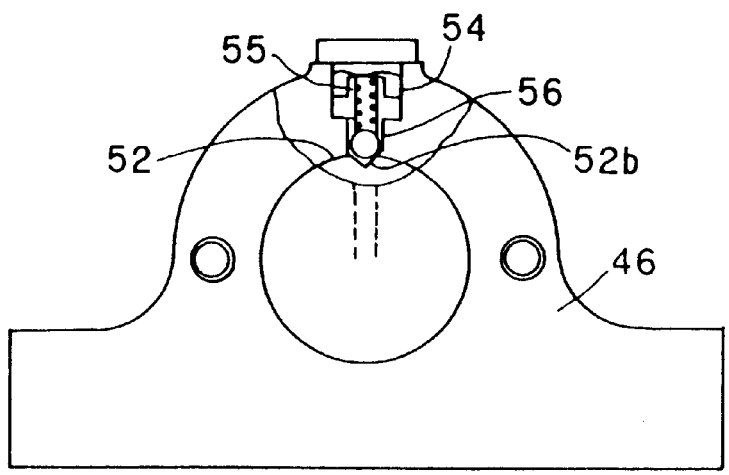

FIG. 3(a) is a cross section along G—G in FIG. 2(a). FIG. 3(b) is a view of FIG. 2(a) in the direction of arrow Z.

A neutral position sensing groove 52b is formed in the cylindrical surface 52e of the support shaft 52, as shown in FIG. 3(b). The casing 46 is also provided with a neutral position sensing mechanism 54 as an operating force varying means. The neutral position sensing mechanism 54 is provided with a ball 56 in contact with the cylindrical surface 52e of the support shaft 52. The ball 56 is pressed against the cylindrical surface 52e by the force of a spring 55.

When the operating lever 6 is placed in the neutral position, the spring 55 is extended, spring force is applied to the ball 56, and the ball 56 is forced into the groove 52b. When the operating lever 6 is moved to a position other than the neutral position, the spring 55 is contracted, and the ball 56 escapes from the groove 52b. It is thus necessary to apply an operating force sufficient to contract the spring 55 and to move the operating lever 6 in order to transfer the operating lever 6 from the neutral position to a position other than the neutral position. The operator will thereby receive sensory feedback indicating that the operating lever 6 is indeed in the neutral position when the lever has been moved to that position.

The tips (top ends) of the pistons 1, 2, 3, and 4 rest against the lower surface of the disk plate 8 on which the operating lever 6 is mounted, as shown in FIG. 7(b). When the operating lever 6 is tilted, the disk plate 8 is tilted in the tilting direction coinciding with the tilting direction of the operating lever 6, and the tilting amount produced is proportional to the tilt of the operating lever 6. Of the pistons 1, 2, 3, and 4, only the pistons that correspond to the tilting direction of the disk plate 8 are displaced, and these pistons are displaced by an amount proportional to the tilt of the disk plate 8.

Consequently, the pistons 1, 2, 3, and 4 are displaced in accordance with the direction and amount of tilt of the operating lever 6.

Figure 12A:
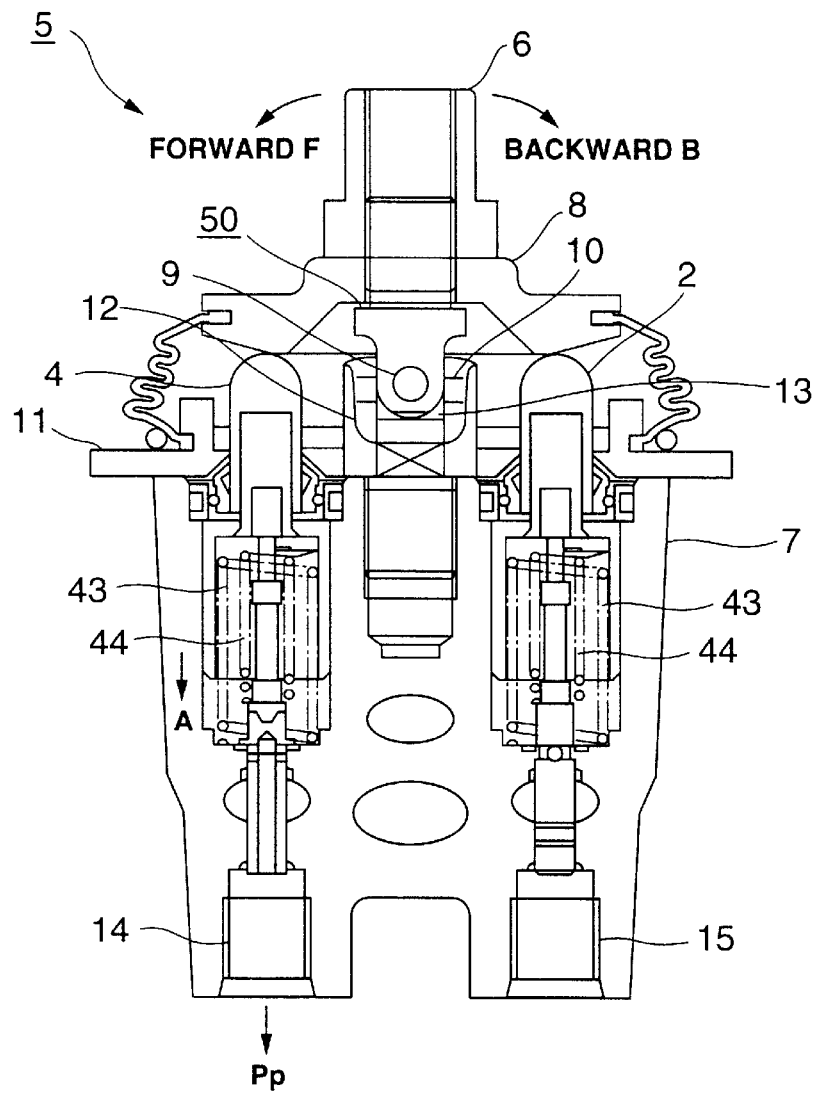
FIG. 12(a) is a cross section depicting the structure of a conventional operating lever device.

Similar to the conventional operating lever device 5 depicted in FIG. 12(a), the device unit 7 is provided with hydraulic signal generation means for generating hydraulic signals whose magnitude corresponds to piston displacement for each of the four pistons 4, 2, 1, and 3. The pistons 4, 2, 1, and 3 correspond to pilot ducts 14, 15, 16, and 17, respectively (see FIG. 7(b)).

The operation of the above-described operating lever device 5 will now be described.

FIGS. 1, 2, and 3 depict a state in which the operating lever 6 is in a neutral position. Let us assume that the operating lever 6 is tilted from this state in an arbitrary tilting direction.

Tilting the operating lever 6 causes the support shaft 52 to rotate about the center axis 52a by the amount of rotation proportional to the longitudinal direction components F and B of the tilting direction, as shown by arrow E. In addition, the support shaft 53 rotates about the center axis 53a by the amount of rotation proportional to the transverse direction components L and R of the tilting direction, as shown by arrow F.

Let us assume that at this point the operator releases the operating lever 6. The support shaft 52 will stop in the position occupied at the moment of release because the frictional force of the sliding members 48a, 48b, and 48c is exerted on the opposite side from the rotational return force of the return springs 43 and 44.

The support shaft 53 is rotated by the rotational return force of the return springs 43 and 44 the moment the operating lever 6 is released.

For this reason, the longitudinal direction components F and B of the tilting direction remain in the tilted positions achieved at the time of release, and the transverse direction components L and R of the tilting direction return to the neutral position when the operating lever 6 is released. The pistons corresponding to the longitudinal direction components F and B will therefore remain displaced, and the hydraulic signal output will be preserved. For the transverse direction components L and R, on the other hand, the piston displacement will return to zero, bringing the hydraulic signal output to zero as well.

Let us now assume that the operating lever 6 is manually actuated to allow the longitudinal direction components F and B of the tilting direction to return to the neutral position. At this time, the tip of the rod 57a of the neutral position detection switch 57 fits into the groove 52c in the support shaft 52. The rod 57a is therefore extended. When the rod 57a is extended, an electrical signal indicating the neutral position is outputted by the neutral position detection switch 57 through an electrical signal line 59. Furthermore, the spring 55 of the neutral position sensing mechanism 54 is extended, the ball 56 is pressed by the spring 55, and the ball 56 is forced into the groove 52b in the support shaft 52. It is thus necessary to apply an operating force sufficient to contract the spring 55 and to move the operating lever 6 in order to transfer the operating lever 6 from the neutral position to a position other than the neutral position. The operator will thereby receive sensory feedback indicating that the lever is indeed in the neutral position.

A first embodiment of the operating lever device was described above.

A second embodiment of the operating lever device will now be described with reference to FIGS. 4 and 5. FIGS. 4(a) and 4(b) depict the structure of the operating lever device in accordance with the second embodiment.

Figure 4A:
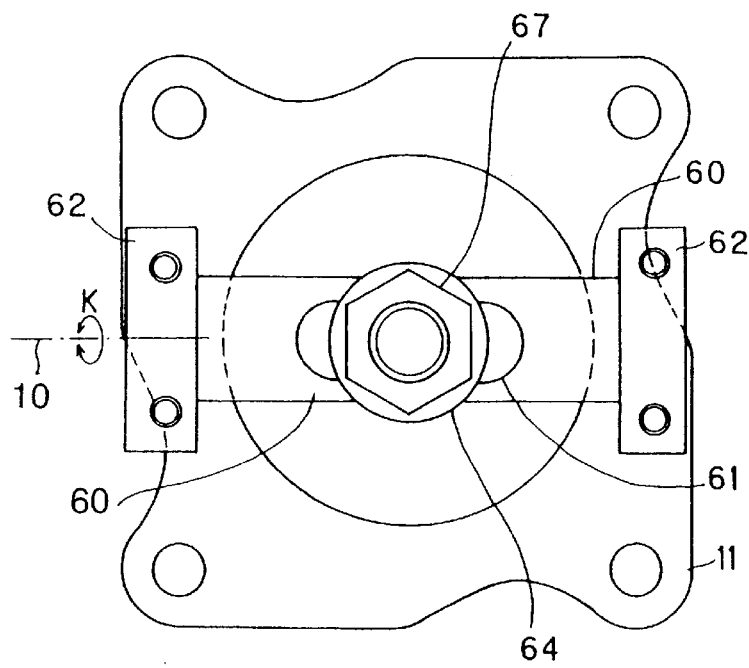
FIGS. 4(a) and 4(b) are block diagrams of an operating lever device according to a second embodiment.
Figure 4B:
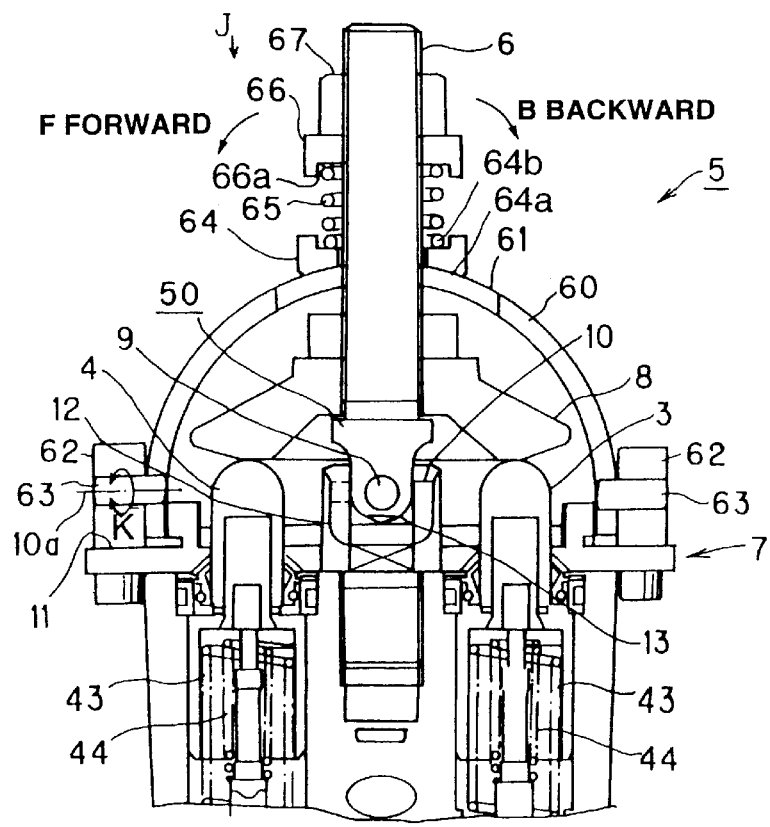

FIG. 4(a) is a top view of FIG. 4(b) in the direction of arrow J. FIG. 4(b) is a cross section corresponding to FIG. 1(b) of the first embodiment.

As can be seen in FIGS. 4(a) and 4(b), the operating lever device 5 primarily comprises a device unit 7 and an operating lever 6. The operating lever 6 can be tilted in relation to the device unit 7. The operating lever 6 is mounted on the device unit 7 through the agency of a disk plate 8 and a universal joint 50.

Figure 12B:
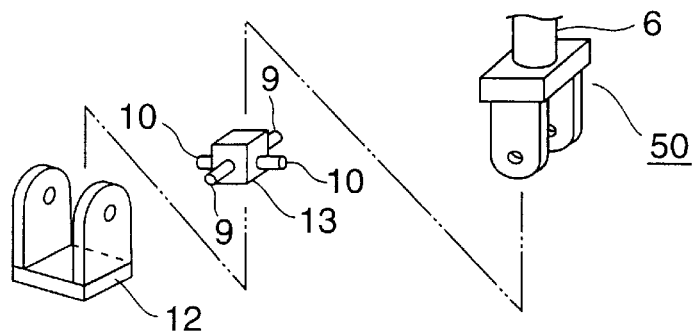
FIG. 12(b) is a perspective view depicting the structure of the universal joint shown in FIG. 12(a)

The difference from the operating lever device 5 depicted in FIGS. 12(a) and 12(b) is that sliding resistance is created when the operating lever 6 is moved along the longitudinal direction components F and B.

The arrangement in which the operating lever 6 is mounted on the mounting plate 11 of the device unit 7 at a different angle is identical to the one described with reference to FIGS. 7(a) and 7(b), and will therefore be omitted from the detailed description. FIG. 4(b) is a cross section of FIG. 7(a), as viewed from the left.

Following is a description of structural differences.

Support members 62 are mounted at both ends of the mounting plate 11 of the device unit 7. The two support members 62 are mounted along the center axis 10a of the support shaft 10. Pins 63 are rotatably fitted into the two support members 62. The pins 63 can rotate about the center axis 10a of the support shaft 10.

An arcuate member 60 is obtained by shaping a plate into an arch. The pins 63 are fixed at both ends of the arcuate member 60. The arcuate member 60 can thus rotate about the center axis 10a of the support shaft 10, and pivot in the direction perpendicular to the plane of paper, as shown by arrow K.

An elliptical opening 61 extended in the lengthwise direction of the arcuate member 60 is formed in the top end of the arcuate member 60.

The operating lever 6 passes through the opening 61. The operating lever 6 can pivot relative to the arcuate member 60 in the lengthwise direction of the arcuate member 60. In other words, the operating lever 6 can move about the center axis of the support shaft 9 orthogonal to the center axis 10a. By contrast, the operating lever 6 cannot pivot relative to the arcuate member 60 in the direction orthogonal to the lengthwise direction of the arcuate member 60. In other words, the movement of the operating lever 6 about the center axis 10a is restricted by the opening 61.

The operating lever 6 is provided with a sliding member 64. The sliding member 64 is threadably fixed to the operating lever 6. The sliding surface 64a of the sliding member 64 is in contact with the sliding surface 60a of the arcuate member 60.

Consequently, sliding resistance is created between the sliding surface 64a of the sliding member 64 and the sliding surface 60a of the arcuate member 60 in contact with the sliding surface 64a when the operating lever 6 is moved in the lengthwise direction of the opening 61 and pivoted relative to the arcuate member 60. Frictional force based on this sliding resistance is applied to the operating lever 6 through the agency of the sliding member 64. The operating lever 6 is stopped at a prescribed tilting position as a result of the fact that the frictional force applied to the operating lever 6 acts on the opposite side from the rotational return force exerted by return springs 43 and 44 and applied to the same operating lever 6. The operating lever 6 is therefore held in the prescribed tilting position.

One end of a spring 65 rests against a bearing surface 64a on the side of the sliding member 64 opposite from the sliding surface 64a. The other end of the spring 65 rests against a spring seat 66 threadably fixed to the operating lever 6. The surface 66b of the of the spring seat 66 on the opposite side from the resting surface 66a for the spring 65 rests against a nut 67 threadably fixed to the operating lever 6. The nut 67 functions as a locknut for fixing the spring seat 66 to the operating lever 6. Consequently, rotating the head of the nut 67 brings the spring seat 66 out of a fixed state. It is therefore possible to adjust the screw-in position of the spring seat 66 in relation to the operating lever 6. Adjusting the screw-in position of the spring seat 66 contracts the spring 65 in accordance with the adjusted position and changes the spring force applied by the spring 65 to the sliding member 64. The pressure exerted by the sliding member 64 on the arcuate member 60 is varied as a result. This varies the sliding resistance between the sliding surface 64a of the sliding member 64 and the sliding surface 60a of the arcuate member 60 in contact with the sliding surface 64a. The force for holding the operating lever 6 in a tilted position can therefore be varied.

The tips (tops) of the pistons 1, 2, 3, and 4 rest against the lower surface of the disk plate 8 on which the operating lever 6 is mounted, as shown in FIGS. 7(a) and 7(b). When the operating lever 6 is tilted, the disk plate 8 is tilted in the tilting direction coinciding with the tilting direction of the operating lever 6, and the tilting amount produced is proportional to the tilt of the operating lever 6. Of the pistons 1, 2, 3, and 4, only the pistons that correspond to the tilting direction of the disk plate 8 are displaced, and these pistons are displaced by an amount proportional to the tilt of the disk plate 8.

Consequently, the pistons 1, 2, 3, and 4 are displaced in accordance with the direction and amount of tilt of the operating lever 6.

Similar to the conventional operating lever device 5 depicted in FIG. 12(a), the device unit 7 is provided with hydraulic signal generation means for generating hydraulic signals whose magnitude corresponds to piston displacement for each of the four pistons 4, 2, 1, and 3. The pistons 4, 2, 1, and 3 correspond to pilot ducts 14, 15, 16, and 17, respectively (see FIG. 7(b)).

The operation of the above-described operating lever device 5 will now be described.

Figure 5A:
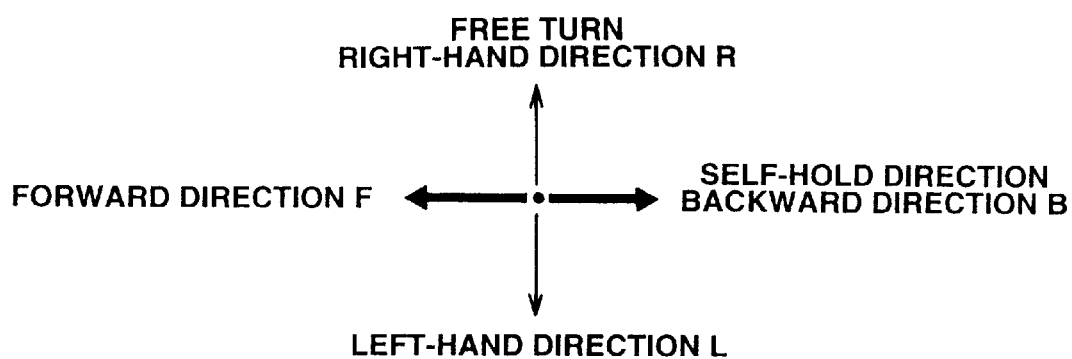
FIGS. 5(a) and 5(b) are diagrams illustrating the operation of the operating lever depicted in FIGS. 4(a) and 4(b)
Figure 5B:
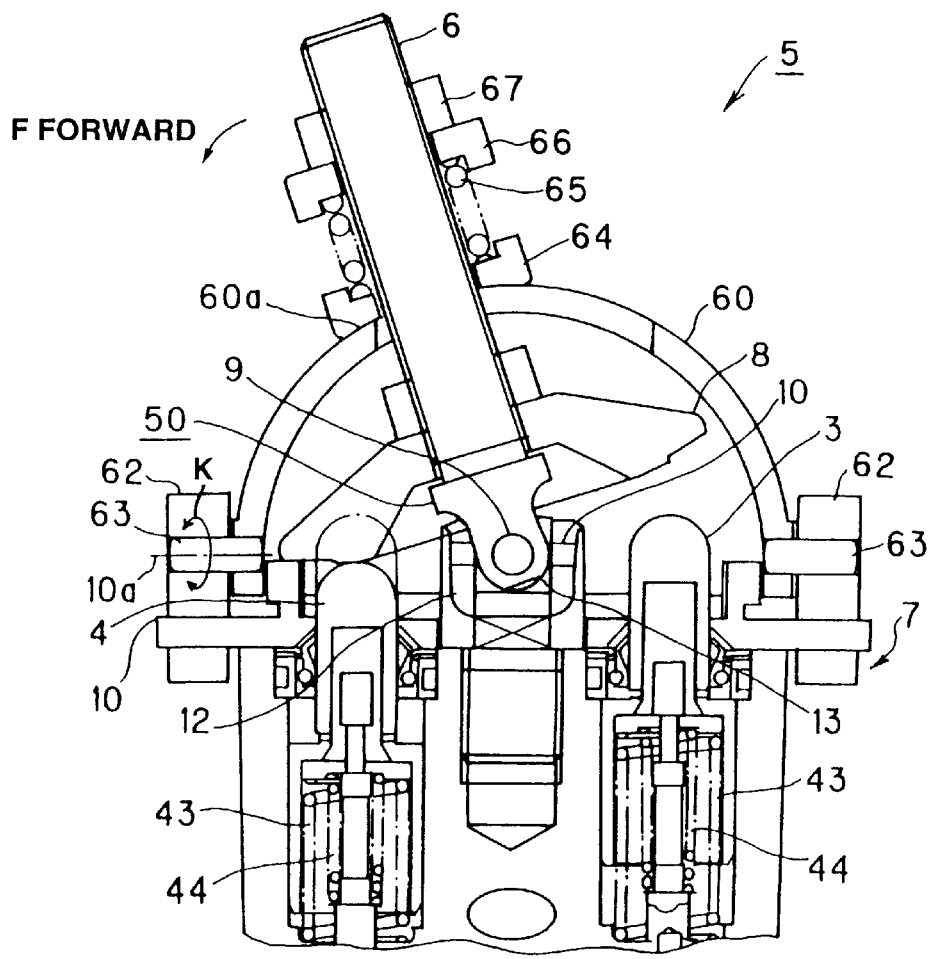

FIG. 4(b) depicts a state in which the operating lever 6 is in a neutral position. Let us assume that the operating lever 6 is tilted from this state in an arbitrary tilting direction. This state is depicted in FIG. 5(b). FIG. 5(a) is a diagram depicting the components along the tilting direction of the operating lever 6. The tilting direction parallel to the plane of paper in FIG. 5(b) corresponds to the longitudinal direction components F and B in FIG. 5(a). The tilting direction perpendicular to the plane of paper in FIG. 5(b) corresponds to the transverse direction components L and R in FIG. 5(a).

Tilting the operating lever 6 will cause the operating lever 6 to pivot through the opening 61 of the arcuate member 60 by the amount of pivoting proportional to the longitudinal direction components F and B of the tilting direction (these correspond to the component F in the forward direction in FIG. 5(b)). In addition, the arcuate member 60 will be pivoted integrally with the operating lever 6 about the center axis 10a by the amount of pivoting proportional to the transverse direction components L and R of the tilting direction, as shown by arrow K.

Let us assume that at this point the operator removes his hand from the operating lever 6. The sliding member 64 stops on the arcuate member 60 when the hand is removed because the frictional force exerted by the sliding member 64 acts on the opposite side from the rotational return force of the return springs 43 and 44.

The arcuate member 60 is rotated about the center axis 10a by the rotational return force of the return springs 43 and 44 the moment the operating lever 6 is released.

For this reason, the longitudinal direction components F and B of the tilting direction remain in the tilted positions achieved at the time of release, and the transverse direction components L and R of the tilting direction return to the neutral position when the operating lever 6 is released. The pistons corresponding to the longitudinal direction components F and B will therefore remain displaced, and the hydraulic signal output will be preserved. For the transverse direction components L and R, on the other hand, the piston displacement will return to zero, bringing the hydraulic signal output to zero as well.

A second embodiment of the operating lever device was described above.

Following is a description of a case in which a vehicle-mounted actuator is operated by an operating lever device.

Figure 8A:
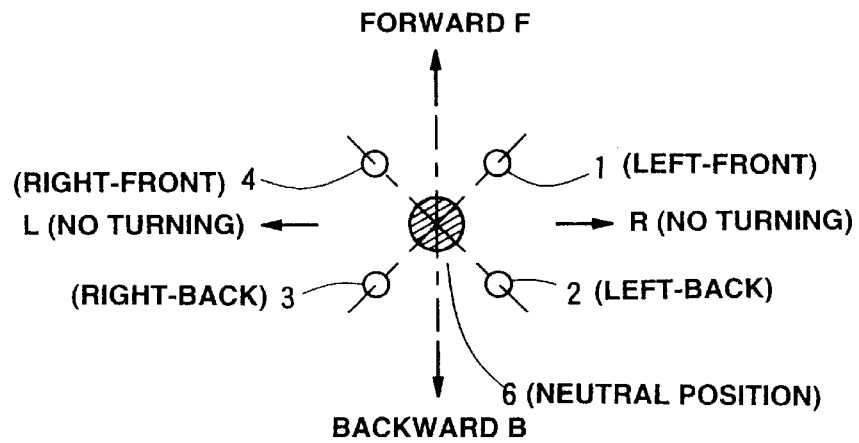
FIGS. 8(a) and 8(b) are diagrams depicting the hydraulic circuit of a vehicle on which the operating lever device pertaining to the present invention is mounted.
Figure 8B:
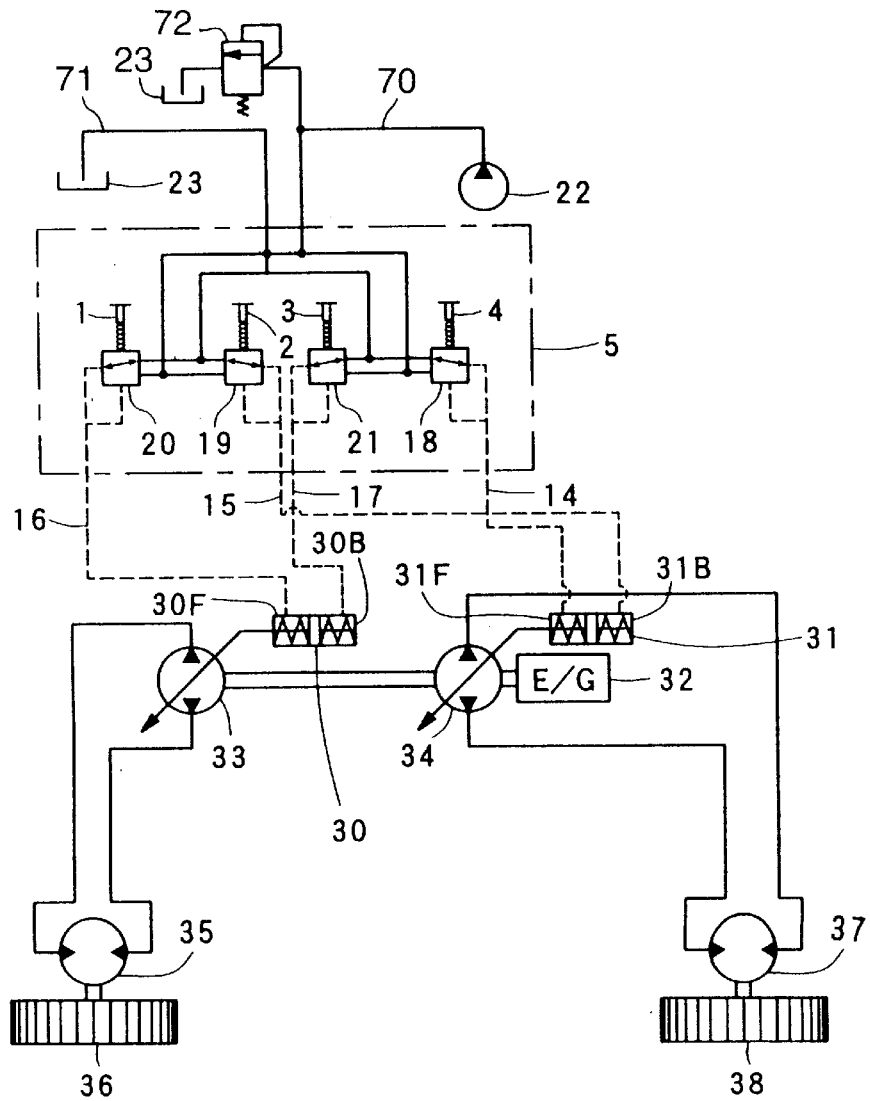

FIG. 8(b) shows the operating lever device 5 as a hydraulic circuit. The first embodiment of a hydraulic drive device mounted on a skid steer loader or other vehicle is depicted as a hydraulic circuit in FIG. 8(b). FIG. 8(a) illustrates the manner in which pistons 1, 2, 3, and 4 are arranged in the operating lever device 5.

As shown in FIG. 8(b), pilot pressure oil is fed to the operating lever device 5 by an operating lever pump 22. A tank 23 is also connected to the operating lever device 5. The operating lever pump 22 is driven by an engine 32.

Pressure regulators 20, 19, 21, and 18 are provided to the pistons 1, 2, 3, and 4, respectively. Specifically, the set pressures of the pressure regulators 20, 19, 21, and 18 can be increased by the depression of the pistons 1, 2, 3, and 4, respectively.

The inlet ports of the pressure regulators 20, 19, 21, and 18 are connected by a duct 70 to the operating lever pump 22. A relief valve 72 for allowing the pressure of the oil discharged by the operating lever pump 22 into the duct 70 to be limited to a level below a set relief pressure is connected to the duct 70. The inlet ports of the pressure regulators 20, 19, 21, and 18 are also connected by a duct 71 to the tank 23.

The outlet ports of the pressure regulators 20, 19, 21, and 18 are connected to pilot ducts 16, 15, 17, and 14, respectively.

Operation of the operating lever device 5 will now be described.

It is assumed that the operating lever 6 is tilted forward in the F-direction. This causes the pistons 1 and 4 to be depressed through the agency of the disk plate 8.

The stroke S (displacement) of the pistons 1 and 4 is of a magnitude that is proportional to the tilt of the operating lever 6.

Depressing the piston 1 increases the surface area of the opening in the relief valve 20 in accordance with the stroke S, and subjects the pilot duct 16 to a pilot pressure proportional to the surface area of the opening. Consequently, the pilot pressure $P_p$ outputted by the pilot duct 16 is of a magnitude that is proportional to the tilt of the operating lever 6.

Similarly, depressing the piston 4 causes the pilot pressure $P_p$ outputted by the pilot duct 14 to reach a magnitude proportional to the tilt of the operating lever 6.

FIG. 6 shows the relation between the pilot pressure $P_p$ and the stroke S of the operating lever 6. When the operating lever 6 is shifted and the pistons 1 and 4 are moved from a stroke position $S_0$ (which corresponds to the neutral position) to a position $S_F$ for outputting maximum output $P_{pmax}$, the pilot pressure $P_p$ outputted by the pilot ducts 16 and 14 changes from the drain pressure $P_{p0}$ of the tank 23 to the discharge pressure $P_{pmax}$ of the operating lever pump 22.

Described above was a case in which the pistons 1 and 4 were displaced in accordance with the tilt of the operating lever 6, and hydraulic signals indicating the pilot pressure $P_p$ were outputted from the pilot ducts 16 and 14. The same is true when the pistons 2 and 3 are displaced in accordance with the tilt of the operating lever 6. Hydraulic signals indicating the pilot pressure $P_p$ are outputted from the pilot ducts 15 and 17.

A vehicle is provided with a left track 36 and a right track 38 on the left and right sides of the chassis, as shown in FIG. 8(b). The present invention can also be adapted to a vehicle in which wheels are used instead of tracks. In a vehicle fitted with wheels, a hydraulic traction motor serves as the steering motor, and the wheels are driven by gears or chains.

The left-hand hydraulic traction motor 35 is an actuator for driving the left track 36 in two travel directions, forward and backward. The right-hand hydraulic traction motor 37 is an actuator for driving the right track 38 in two travel directions, forward and backward. When the left-hand hydraulic traction motor 35 and right-hand hydraulic traction motor 37 are driven, the left track 36 and right track 38, respectively, are operated. The left- and right-hand hydraulic traction motors 35 and 37 have the same displacement volume.

The operating lever device 5 is connected by hydraulic ducts to cylinders 30 and 31 for the swash-plate control of the left and right variable-displacement hydraulic pumps 33 and 34. In addition, the left and right variable-displacement hydraulic pumps 33 and 34 are connected by hydraulic ducts to the left- and right-hand hydraulic traction motors 35 and 37. The left and right variable-displacement hydraulic pumps 33 and 34 have the same displacement volume.

The variable-displacement hydraulic pumps 33 and 34 and the operating lever pump 22 are driven by the engine 32.

Here, the direction of the forward movement of the left-hand hydraulic traction motor 35 is made to correspond to the piston 1 in the right-upper position, as shown in FIG. 8(a). The direction of the backward advance of the right-hand hydraulic traction motor 37 is made to correspond to the piston 2 in the right-lower position. The direction of the backward advance of the left-hand hydraulic traction motor 35 is made to correspond to the piston 3 in the left-lower position. The direction of the forward movement of the right-hand hydraulic traction motor 37 is made to correspond to the piston 4 in the left-upper position.

Specifically, the pilot duct 16 is connected to the cylinder chamber 30F of the swash-plate controlling cylinder 30. The pilot duct 15 is connected to the cylinder chamber 31B of the swash-plate controlling cylinder 31. The pilot duct 17 is connected to the cylinder chamber 30B of the swash-plate controlling cylinder 30. The pilot duct 14 is connected to the cylinder chamber 31F of the swash-plate controlling cylinder 31.

Consequently, displacing the pistons 1, 2, 3, and 4 generates a pilot pressure $P_p$ in the pilot ducts 16, 15, 17, and 14 corresponding to the pistons 1, 2, 3, and 4 thus displaced, and hydraulic traction motors corresponding to these displaced pistons 1, 2, 3, and 4 are correspondingly driven in the corresponding directions of travel by the amounts proportional to these displacements.

This arrangement allows the left and right tracks 36 and 38 to be moved at speeds proportional to the amount of tilt of the operating lever 6 in rotational directions that correspond to the direction of tilt of the operating lever 6.

Figure 10:
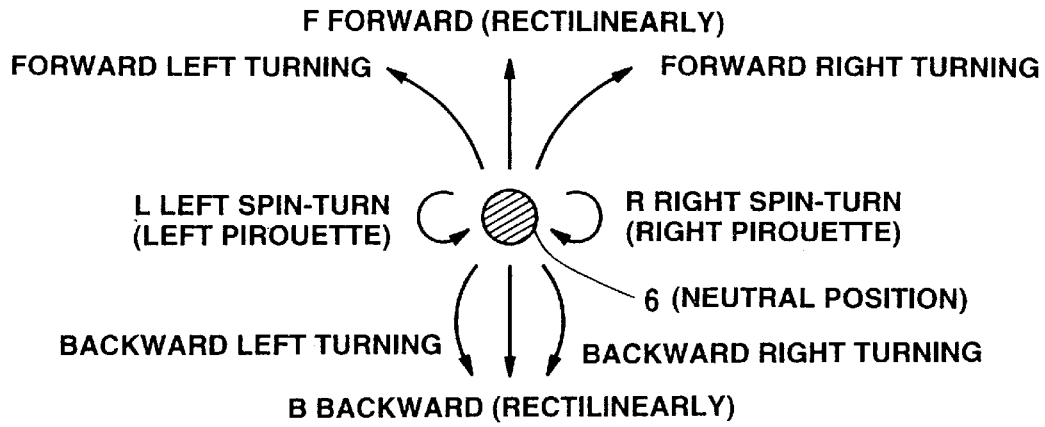
FIG. 10 is a diagram illustrating the movement of a skid steer loader or other vehicle moving in accordance with the tilting direction of the operating lever.

FIG. 10 is an operating pattern, primarily for a vehicle such as a skid steer loader. The arrows in the drawing indicate the directions in which the vehicle is caused to travel in accordance with the tilting direction of the operating lever 6. The operation of the hydraulic circuit depicted in FIG. 8(b) will now be described with reference to FIG. 10.

It is assumed here that the operating lever 6 is tilted forward (rectilinearly) from the neutral position in the F-direction, as shown in FIG. 10.

At this time, hydraulic signals $P_p$ (pilot pressure oil) of equal magnitude are outputted from the pilot ducts 16 and 14 as a result of the fact that the pistons 1 and 4 of the operating lever device 5 are displaced by the same stroke. The hydraulic signal $P_p$ (pilot pressure oil) outputted from the pilot duct 16 is fed to the cylinder chamber 30F corresponding to the left-hand forward traction of the swash-plate controlling cylinder 30. The hydraulic signal $P_p$ (pilot pressure oil) outputted from the pilot duct 14 is fed to the cylinder chamber 31F corresponding to the right-hand forward traction of the swash-plate controlling cylinder 31.

The swash plate of the left-hand traction hydraulic pump 33 is thereby switched to an inclination corresponding to forward movement, and the pressure oil discharged from the left-hand traction hydraulic pump 33 is inputted to the inlet port corresponding to the forward movement side of the left-hand hydraulic traction motor 35. In addition, the swash plate of the right-hand traction hydraulic pump 34 is switched to an inclination corresponding to forward movement, and the pressure oil discharged from the right-hand traction hydraulic pump 34 is inputted to the inlet port corresponding to the forward movement side of the right-hand hydraulic traction motor 38.

As a result, the left and right tracks 36 and 38 are rotatably moved forward, and the vehicle advances (rectilinearly) in the direction shown by the arrow in FIG. 10. Vehicle speed corresponds to the amount of tilt of the operating lever 6.

In FIG. 10, the pistons 2 and 3 are depressed when the operating lever 6 is tilted backward in the B-direction. When the piston 2 is depressed and a hydraulic signal $P_p$ is generated, the right-hand hydraulic traction motor 37, which corresponds to the piston 2 generating this hydraulic signal $P_p$, is driven rearward in the corresponding direction by the amount of drive proportional to the hydraulic signal $P_p$. When the piston 3 is depressed and a hydraulic signal $P_p$ is generated, the left-hand hydraulic traction motor 35, which corresponds to the piston 3 generating this hydraulic signal $P_p$, is driven rearward in the corresponding direction by the amount of drive proportional to the hydraulic signal $P_p$. As a result, the vehicle moves backward (rectilinearly), as shown by the corresponding arrow in FIG. 10.

Also in FIG. 10, the pistons 1 and 2 are depressed when the operating lever 6 is tilted in the R-direction of a right spin-turn (pirouette). When the piston 1 is depressed and a hydraulic signal $P_p$ is generated, the left-hand hydraulic traction motor 35, which corresponds to the piston 1 generating this hydraulic signal $P_p$, is driven forward in the corresponding direction by the amount of drive proportional to the hydraulic signal $P_p$. When the piston 2 is depressed and a hydraulic signal $P_p$ is generated, the right-hand hydraulic traction motor 37, which corresponds to the piston 2 generating this hydraulic signal $P_p$, is driven rearward in the corresponding direction by the amount of drive proportional to the hydraulic signal $P_p$. As a result, the same pressure is applied to the cylinder chamber 30F of the swash-plate controlling cylinder 30 and the cylinder chamber 31B of the swash-plate controlling cylinder 31, and the hydraulic motor 35 and hydraulic motor 37 are driven at the same speed but in opposite directions. In other words, the vehicle performs a right spin-turn (pirouette), as shown by the corresponding arrow in FIG. 10.

Also in FIG. 10, the pistons 3 and 4 are depressed when the operating lever 6 is tilted in the L-direction of a left spin-turn (pirouette). When the piston 3 is depressed and a hydraulic signal $P_p$ is generated, the left-hand hydraulic traction motor 35, which corresponds to the piston 3 generating this hydraulic signal $P_p$, is driven backward in the corresponding direction by the amount of drive proportional to the hydraulic signal $P_p$. When the piston 4 alone is depressed and a hydraulic signal $P_p$ is generated, the right-hand hydraulic traction motor 37, which corresponds to the piston 4 generating this hydraulic signal $P_p$, is driven forward in the corresponding direction by the amount of drive proportional to the hydraulic signal $P_p$. As a result, the same pressure is applied to the cylinder chamber 30B of the plate controlling cylinder 30 and the cylinder chamber 31F of the swash-plate controlling cylinder 31, and the hydraulic motor 35 and hydraulic motor 37 are driven at the same speed but in opposite directions. In other words, the vehicle performs a left spin-turn (pirouette), as shown by the corresponding arrow in FIG. 10.

Also in FIG. 10, the piston 1 alone is depressed when the operating lever 6 is tilted in a direction intermediate between the F-direction and R-direction. When the piston 1 alone is depressed and a hydraulic signal $P_p$ is generated, it is only the left-hand hydraulic traction motor 35, which corresponds to the piston 1 generating this hydraulic signal $P_p$, that is driven forward in the corresponding direction by the amount of drive proportional to the hydraulic signal $P_p$. As a result, the vehicle turns right while moving forward, as shown by the corresponding arrow in FIG. 10.

Also in FIG. 10, the piston 2 alone is depressed when the operating lever 6 is tilted in a direction intermediate between the R-direction and B-direction. When the piston 2 alone is depressed and a hydraulic signal $P_p$ is generated, it is only the right-hand hydraulic traction motor 37, which corresponds to the piston 2 generating this hydraulic signal $P_p$, that is driven backward in the corresponding direction by the amount of drive proportional to the hydraulic signal $P_p$. As a result, the vehicle turns right while moving backward, as shown by the corresponding arrow in FIG. 10.

Also in FIG. 10, the piston 3 alone is depressed when the operating lever 6 is tilted in a direction intermediate between the B-direction and L-direction. When the piston 3 alone is depressed and a hydraulic signal $P_p$ is generated, it is only the left-hand hydraulic traction motor 35, which corresponds to the piston 3 generating this hydraulic signal $P_p$, that is driven backward in the corresponding direction by the amount of drive proportional to the hydraulic signal $P_p$. As a result, the vehicle turns left while moving backward, as shown by the corresponding arrow in FIG. 10.

Also in FIG. 10, the piston 4 alone is depressed when the operating lever 6 is tilted in a direction intermediate between the L-direction and F-direction. When the piston 4 alone is depressed and a hydraulic signal $P_p$ is generated, it is only the right-hand hydraulic traction motor 37, which corresponds to the piston 4 generating this hydraulic signal $P_p$, that is driven forward in the corresponding direction by the amount of drive proportional to the hydraulic signal $P_p$. As a result, the vehicle turns left while moving forward, as shown by the corresponding arrow in FIG. 10.

In particular, cases in which the piston 1 alone is depressed and the vehicle is turned are referred to as "pivot turns." A pivot turn is a turn in which the hydraulic motor on only one side is driven while the hydraulic motor on the other side is stopped.

Figure 9A:
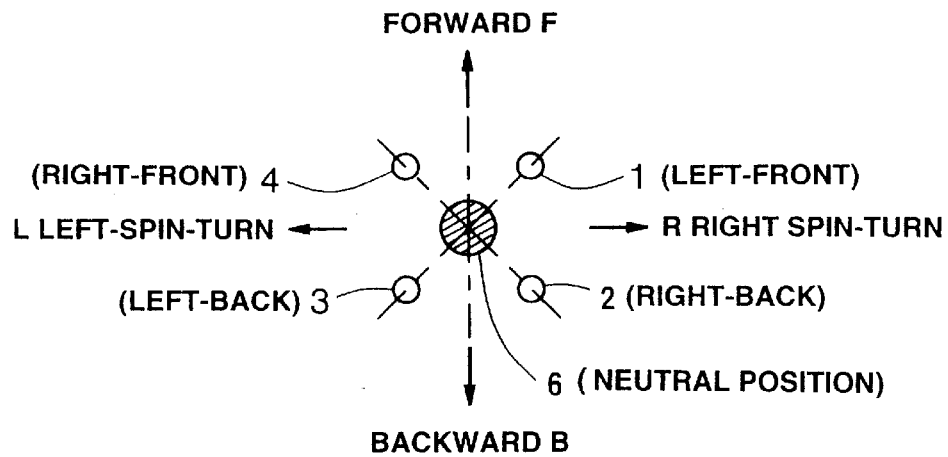
FIGS. 9(a) and 9(b) are diagrams depicting the hydraulic circuit of a vehicle on which the operating lever device pertaining to the present invention is mounted.
Figure 9B:
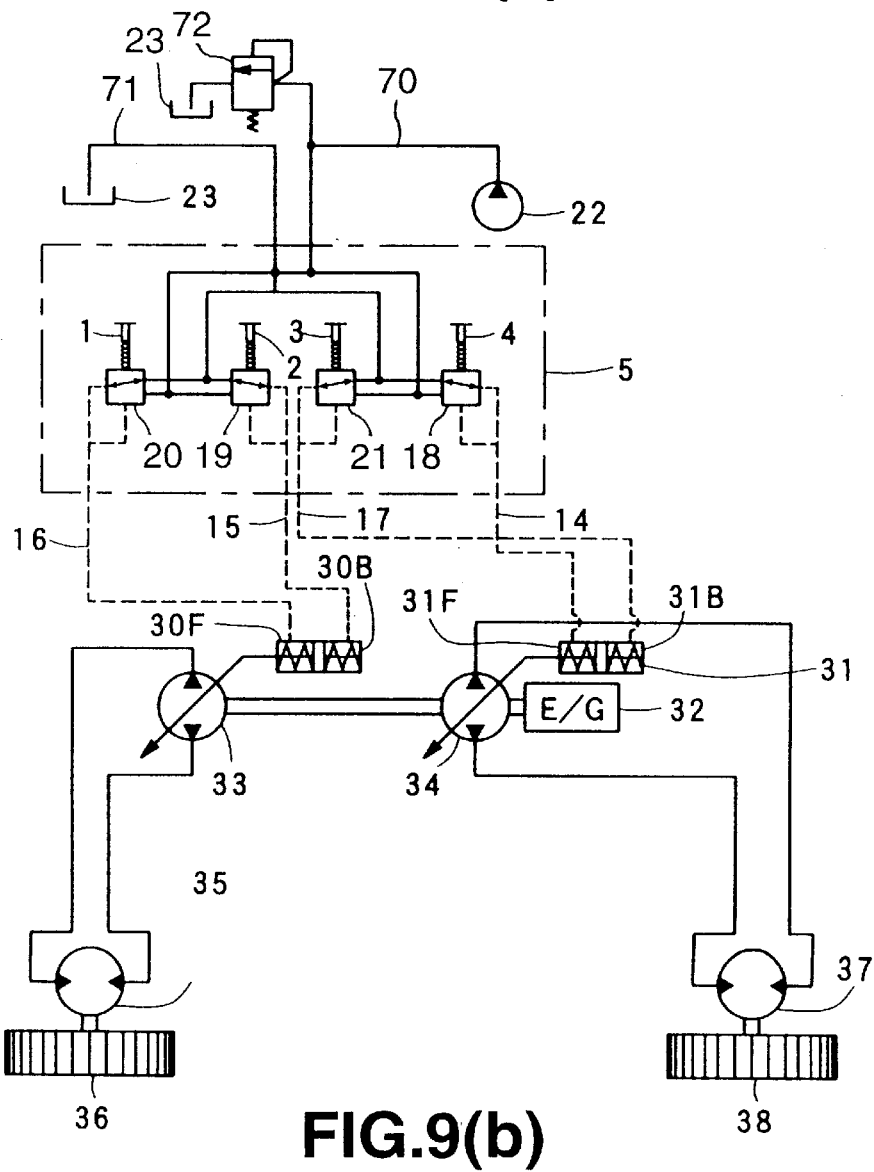

FIG. 9(b) depicts as a hydraulic circuit a second embodiment of a hydraulic drive device mounted on a bulldozer or other vehicle. FIG. 9(a) depicts the arrangement of pistons 1, 2, 3, and 4 in the operating lever device 5.

In FIGS. 9(a) and 9(b), the elements having the same symbols are identical to those in FIGS. 8(a) and 8(b), and will therefore be omitted from the description. The operating pattern for the operating lever 6 of a vehicle such as a bulldozer is different from that of a vehicle such as a skid steer loader. For this reason, the pilot ducts 16, 15, 17, and 14 of the operating lever device 5 and the cylinder chambers of the swash-plate controlling cylinders 30 and 31 are connected somewhat differently.

Specifically, in the hydraulic circuit depicted in FIG. 9(b), the pilot duct 15 is connected to the cylinder chamber 30B of the swash-plate controlling cylinder 30 in a manner different from that adopted for the hydraulic circuit depicted in FIG. 8(b). In addition, the pilot duct 17 is connected to the cylinder chamber 31B of the swash-plate controlling cylinder 31.

Figure 11:
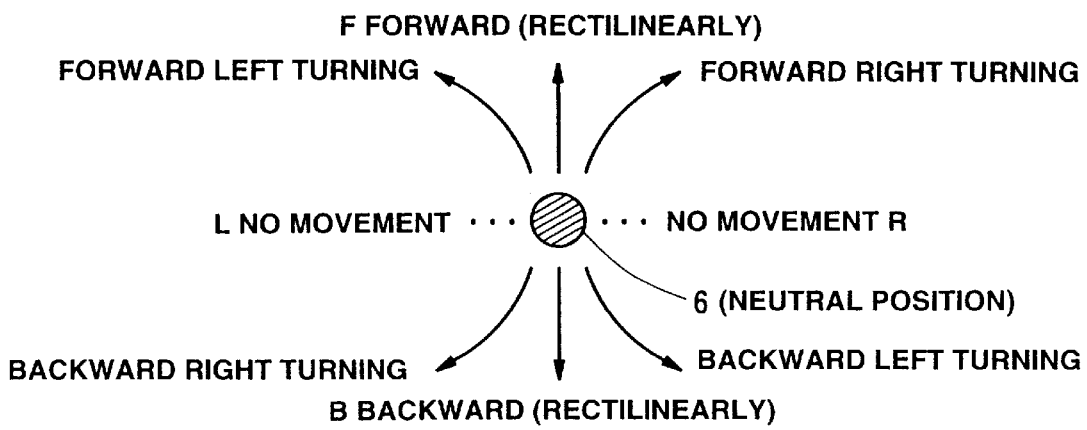
FIG. 11 is a diagram illustrating the movement of a bulldozer or other vehicle moving in accordance with the tilting direction of the operating lever.

FIG. 11 is an operating pattern, primarily for a vehicle such as a bulldozer. The arrows in the drawing indicate the directions in which the vehicle is caused to travel in accordance with the tilting direction of the operating lever 6. The operation of the hydraulic circuit depicted in FIG. 9(b) will now be described with reference to FIG. 11.

The vehicle moves forward (rectilinearly) when the operating lever 6 is tilted forward in the F-direction and the pistons 1 and 4 are depressed, as shown in FIG. 11.

In addition, the vehicle moves backward (rectilinearly) when the operating lever 6 is tilted backward in the B-direction and the pistons 2 and 3 are depressed.

When the operating lever 6 is tilted to the right in the R-direction and the pistons 1 and 2 are depressed, the swash plate of the hydraulic pump 33 assumes a neutral position as a result of the fact that the same pressure is applied to the cylinder chambers 30B and 30F of the swash-plate controlling cylinder 30.

When the operating lever 6 is tilted to the left in the L-direction and the pistons 3 and 4 are depressed, the vehicle is stopped in the same manner as when the lever is tilted in the R-direction.

The vehicle turns right while moving forward when the operating lever 6 is tilted in a direction intermediate between the F-direction and R-direction, and the piston 1 alone is depressed.

The vehicle turns left while moving backward when the operating lever 6 is tilted in a direction intermediate between the R-direction and B-direction, and the piston 2 alone is depressed.

The vehicle turns right while moving backward when the operating lever 6 is tilted in a direction intermediate between the B-direction and L-direction, and the piston 3 alone is depressed.

The vehicle turns left while moving forward when the operating lever 6 is tilted in a direction intermediate between the L-direction and F-direction, and the piston 4 alone is depressed.

It is now assumed that the operating lever 6 is tilted in a direction intermediate between the forward direction (F) and the right-hand direction (R), and the vehicle turns right while moving forward, as shown in FIGS. 10 and 11.

If the operator releases the operating lever 6 at this point, the operating lever 6 remains in the tilted position along the forward direction component F. The pistons 1 and 4 of the forward direction component F will thereby preserve their displaced state, and the hydraulic signal outputs of the corresponding pilot ducts 16 and 14 will also be preserved. The vehicle will therefore continue moving in the forward direction at the current travel speed thereof.

According to this embodiment, the vehicle can thus be driven in a manner that completely agrees with operator requirements.

The following effects can be obtained using the operating lever device 5 in accordance with the first embodiment in FIGS. 1 to 3.

Specifically, let us assume that the operator manually operates the operating lever 6 and returns the longitudinal components F and B of the tilting direction to a neutral position. At this time, the spring 55 of the neutral position sensing mechanism 54 is extended, pressure is applied by the spring 55 to the ball 56, and the ball 56 is forced into the groove 52b in the support shaft 52. It is thus necessary to apply an operating force sufficient to contract the spring 55 and to move the operating lever 6 in order to transfer the operating lever 6 from the neutral position to a position other than the neutral position. The operator will thereby receive sensory feedback indicating that the lever is indeed in the neutral position.

It is thus unnecessary for the operator to visually follow the operating lever 6 or to monitor the movements of the running gear (tracks 36 and 38) of the vehicle to ascertain that the operating lever 6 is indeed in the neutral position when the lever is manually returned to the neutral position. In addition, operator stress is reduced because there is no need to concentrate on the operation of the operating lever 6.

Let us now assume that the operator manually operates the operating lever 6 and returns the longitudinal components F and B of the tilting direction to a neutral position. At this time, the tip of the rod 57a of the neutral position detection switch 57 is forced into the groove 52c in the support shaft 52. The rod 57a is therefore extended. When the rod 57a is extended, an electrical signal indicating the neutral position is outputted by the neutral position detection switch 57 through an electrical signal line 59. Here, the electrical signal line 59 is connected to the starter of the engine 32. The engine starter control system is configured such that the starting of the engine 32 is not permitted in the absence of a neutral position signal inputted to the starter via the electrical signal line 59.

Configuring the engine starter control system in this manner prevents the engine 32 from being started by operating the starter switch of the engine 32 unless the operating lever 6 is in the neutral position. As a result, it is possible to prevent situations in which the operator accidentally jolts the vehicle by operating the starter switch of the engine 32 despite the fact that the operating lever 6 is not in the neutral position. Preventing the vehicle from being jolted is not limited to the engine 32 alone and may include situations in which a drive source other than the engine 32 is prevented from being operated.

The present embodiment was described with reference to a case in which the operating lever device 5 is an operating lever device used for traction purposes. The present invention, however, is not limited to this application and may be adapted to operating lever devices for controlling process equipment.

FIGS. 7(*a*) and 7(*b*) depict another possible arrangement for the pistons 1 to 4 of the operating lever device according to the first embodiment in FIGS. 1 to 3, or the operating lever device 5 according to the second embodiment in FIGS. 4 and 5. It is also possible to adopt the arrangement depicted in FIGS. 13(*a*) and 13(*b*), which is the same as the conventional arrangement.

Figure 15:
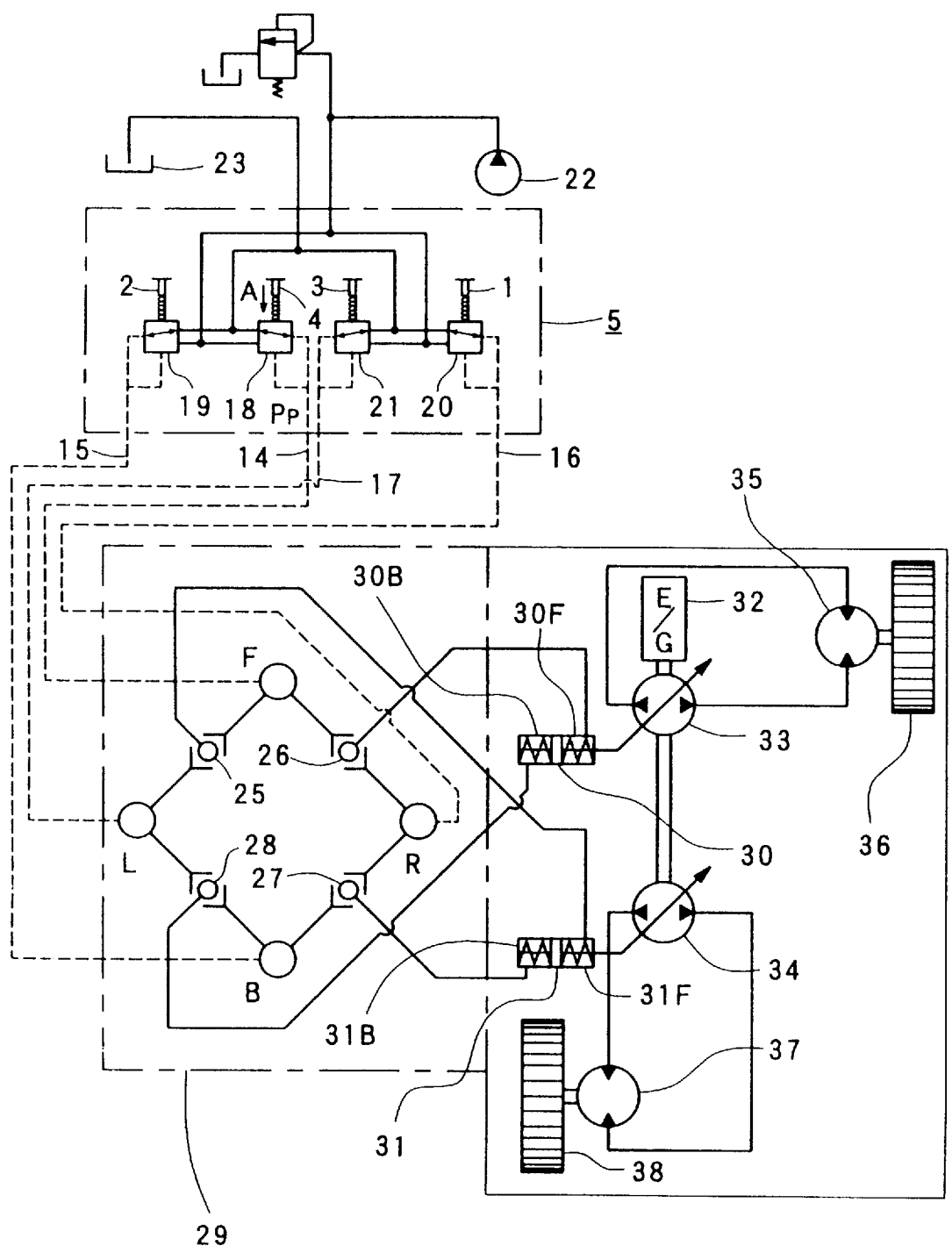
FIG. 15 is a diagram depicting the hydraulic circuit of a vehicle on which the operating lever device pertaining to the present invention is mounted.
Figure 16:
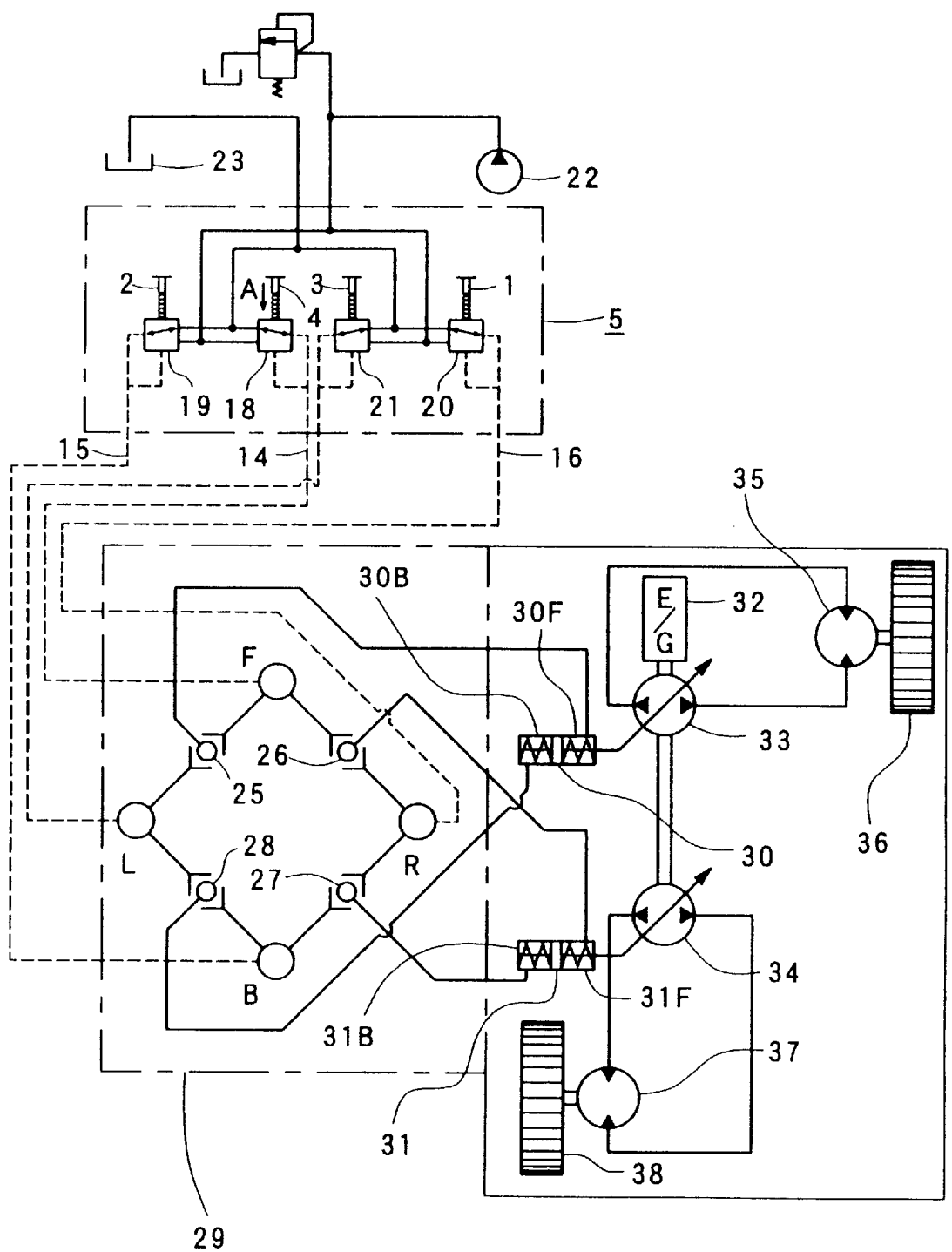
FIG. 16 is a diagram depicting the hydraulic circuit of a vehicle on which the operating lever device pertaining to the present invention is mounted.

FIGS. 15 and 16 are hydraulic circuit diagrams of a vehicle in which the pistons 1 to 4 of the operating lever device 5 are arranged in the same manner as in FIGS. 13(*a*) and 13(*b*). FIG. 15 corresponds to FIG. 8(*b*). FIG. 16 corresponds to FIG. 9(*b*). For the sake of convenience, the same structural elements as those depicted in FIGS. 8(*b*) and 9(*b*) are omitted from the description.

The hydraulic circuit depicted in FIG. 15 will now be described. The hydraulic drive device of FIG. 15 is primarily mounted on skid steer loaders and other such vehicles.

The drive signal generating circuit 29 in FIG. 15 comprises shuttle valves 25, 26, 27, and 28 for comparing hydraulic signals outputted by the two adjacent pistons in FIG. 13(*a*), and outputting the larger pressure signal.

The pilot duct 14 is connected to the inlet port F of the shuttle valves 25 and 26, the pilot duct 15 is connected to the inlet port B of the shuttle valves 27 and 28, the pilot duct 16 is connected to the inlet port R of the shuttle valves 26 and 27, and the pilot duct 17 is connected to the inlet port L of the shuttle valves 25 and 28.

The outlet port of the shuttle valve 25 is connected to the cylinder chamber 31F of the swash-plate controlling cylinder 31. The outlet port of the shuttle valve 26 is connected to the cylinder chamber 30F of the swash-plate controlling cylinder 30. The outlet port of the shuttle valve 27 is connected to the cylinder chamber 31B of the swash-plate controlling cylinder 31. The outlet port of the shuttle valve 28 is connected to the cylinder chamber 30B of the swash-plate controlling cylinder 30.

The operating lever pump 22 and the variable-displacement hydraulic pumps 33 and 34 are driven by the engine 32.

Consequently, displacing the pistons 1, 2, 3, and 4 generates a pilot pressure $P_p$ in the pilot ducts 16, 15, 17, and 14 corresponding to the pistons 1, 2, 3, and 4 thus displaced, and hydraulic traction motors corresponding to these displaced pistons 1, 2, 3, and 4 are correspondingly driven in the corresponding directions of travel by the amounts proportional to these displacements.

This arrangement allows the left and right tracks 36 and 38 to be moved at speeds proportional to the amount of tilt of the operating lever 6 in rotational directions that correspond to the direction of tilt of the operating lever 6.

Operation of the hydraulic circuit depicted in FIG. 15 will now be described with reference to FIG. 10.

It is assumed here that the operating lever 6 is tilted forward (rectilinearly) from the neutral position in the F-direction, as shown in FIG. 10.

At this time, only the piston 4 of the operating lever device 5 is displaced. Consequently, the pilot duct 14 alone outputs a hydraulic signal $P_p$. The hydraulic signal $P_p$ is introduced into the drive signal generating circuit 29 and is inputted to the shuttle valves 25 and 26. Because no pilot pressure is applied at this time to the inlet ports L and R, the hydraulic signal $P_p$ is outputted from the shuttle valves 25 and 26. The shuttle valve 25 outputs a drive signal (pilot pressure) that corresponds to the direction of forward movement of the right-hand hydraulic traction motor 37, and the pilot pressure oil is fed to the cylinder chamber 31F corresponding to the right-hand traction forward movement of the swash-plate controlling cylinder 31. In addition, the shuttle valve 26 of the drive signal generating circuit 29 outputs a drive signal (pilot pressure) that corresponds to the direction of forward movement of the left-hand traction hydraulic pump 33, and the outputted pressure oil is fed to the cylinder chamber 30F corresponding to the left-hand traction forward movement of the swash-plate controlling cylinder 30.

The swash plate of the right-hand traction hydraulic pump 34 is thereby switched to an inclination corresponding to forward movement, and the pressure oil discharged from the right-hand traction hydraulic pump 34 is inputted to the inlet port corresponding to the forward movement side of the right-hand hydraulic traction motor 38. In addition, the swash plate of the left-hand traction hydraulic pump 33 is switched to an inclination corresponding to forward movement, and the pressure oil discharged from the left-hand traction hydraulic pump 33 is inputted to the inlet port corresponding to the forward movement side of the left-hand hydraulic traction motor 35. The same pressure is outputted from the shuttle valves 25 and 26. The same pressure is outputted from the left and right variable-displacement hydraulic pumps 33 and 34, and the same pressure is inputted to the left- and right-hand hydraulic traction motors 35 and 37. Consequently, the left- and right-hand hydraulic traction motors 35 and 37 rotate at the same speed.

As a result, the tracks 36 and 38 are driven forward at the same speed, and the vehicle moves forward (rectilinearly), as shown by the corresponding arrow in FIG. 10.

In FIG. 10, the vehicle moves backward (rectilinearly) in the same manner when the operating lever 6 is tilted backward in the B-direction.

The vehicle performs a right spin-turn (pirouette) when the operating lever 6 is tilted along the right spin-turn (pirouette) in the R-direction.

The vehicle performs a left spin-turn (pirouette) when the operating lever 6 is tilted along the left spin-turn (pirouette) in the L-direction.

The vehicle turns right while moving forward when the operating lever 6 is tilted in a direction intermediate between the F-direction and R-direction.

The vehicle turns right while moving backward when the operating lever 6 is tilted in a direction intermediate between the R-direction and B-direction.

The vehicle turns left while moving backward when the operating lever 6 is tilted in a direction intermediate between the B-direction and L-direction.

The vehicle turns left while moving forward when the operating lever 6 is tilted in a direction intermediate between the L-direction and F-direction.

The hydraulic drive device shown in FIG. 16 below is primarily mounted on bulldozers and other such vehicles.

In FIG. 16, the elements having the same symbols are identical to those in FIG. 15, and will therefore be omitted from the description. FIG. 11 shows an operating pattern of the device in FIG. 16.

The following features are different from those of the hydraulic circuit shown in FIG. 15. Namely, the outlet port of the shuttle valve 25 in the hydraulic circuit shown in FIG. 16 is connected to the cylinder chamber 30F of the swash-plate controlling cylinder 30, and the outlet port of the shuttle valve 26 is connected to the cylinder chamber 31F of the swash-plate controlling cylinder 31.

Consequently, the vehicle moves forward (rectilinearly) when the operating lever 6 is tilted forward in the F-direction, as shown in FIG. 11.

The vehicle moves backward (rectilinearly) when the operating lever 6 is tilted backward in the B-direction.

The vehicle stops when the operating lever 6 is tilted right in the R-direction.

The vehicle stops when the operating lever 6 is tilted left in the L-direction.

Tilting the operating lever 6 in a direction intermediate between the F-direction and R-direction will cause the vehicle to turn right while moving forward.

Tilting the operating lever 6 in a direction intermediate between the R-direction and B-direction will cause the vehicle to turn left while moving backward.

Tilting the operating lever 6 in a direction intermediate between the B-direction and L-direction will cause the vehicle to turn right while moving backward.

Tilting the operating lever 6 in a direction intermediate between the L-direction and F-direction will cause the vehicle to turn left while moving forward.

In the present embodiment, the operating lever 6 is held in place by frictional force. As an alternative, the operating lever 6 may also be held in place by applying upward pressure to pistons (pistons 2 and 3 on the opposite side, assuming that the pistons 1 and 4 in FIG. 8($a$) are depressed) on the opposite side from the pistons depressed by the tilting action of the operating lever 6. Causing pressure oil to act on the pistons on the opposite side (for example, pistons 2 and 3) can be suggested as a method for applying upward pressure to the pistons.

Another feature of the present embodiment is that the operating force of the operating lever 6 can be varied by fitting the ball 56 of a neutral position sensing mechanism 54 into a groove 52$b$ formed in a support member 52. Alternatively, it is possible to cause pressure oil to act on the pistons corresponding to the components of the holding direction (for example, on the pistons 2 and 3 on the opposite side from pistons 1 and 4 when the components of the holding direction in FIG. 8(a) are longitudinal directions F and B) when the operating lever 6 is in the neutral position, and to vary the operating force of the operating lever 6 placed in the neutral position.

The present embodiment was described with reference to a case in which the tilted position was preserved with respect to the longitudinal direction components F and B, which are included in the longitudinal direction components F and B and transverse direction components L and R of the operating lever 6. It is also possible, however, to construct the operating lever device 5 such that the tilted position is preserved with respect to the transverse direction components L and R.

Following is a description of a lever hold canceling device for canceling the function whereby the above-described operating lever 6 is held in a tilted position.

Figure 17:
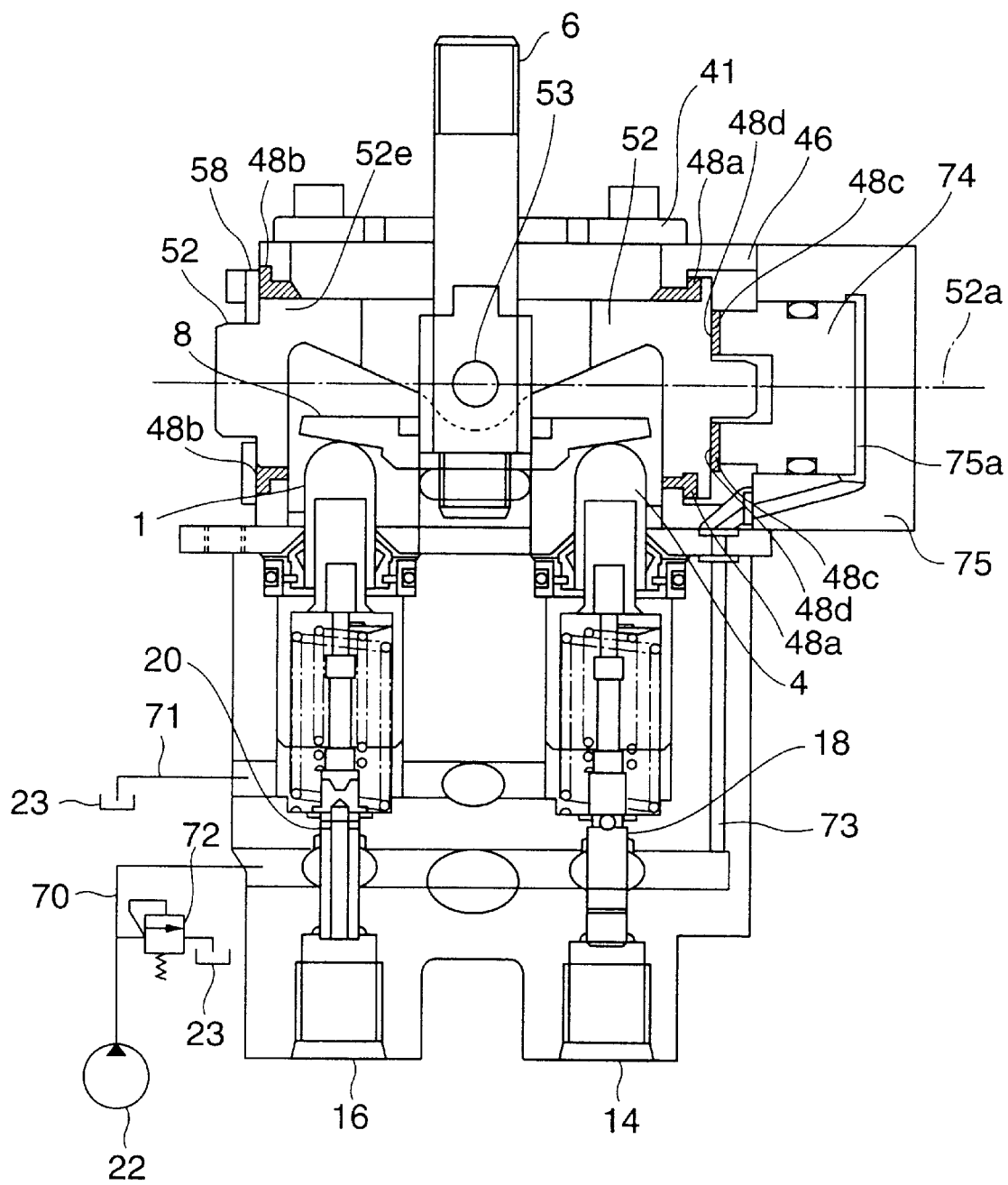
FIG. 17 is a diagram depicting the structure of a first example of a lever unlocking device.

FIG. 17 is a block diagram of an example of such a lever hold canceling device. It is assumed that the operating lever device 5 in FIG. 17 is the same as the operating lever device 5 of the first embodiment depicted in FIGS. 1 to 3. FIG. 17 corresponds to FIG. 3(a). The vehicle is propelled in the longitudinal directions F and B when the operating lever 6 is tilted in the direction perpendicular to the plane of paper in FIG. 17. When the operating lever 6 is tripped along the line of sight into the plane of paper, the pistons 1 and 4 are depressed, and the vehicle is propelled forward.

For the sake of convenience, the same structural elements as in FIGS. 1 and 3 are assumed to perform the same functions and are omitted from the description that follows.

As can be seen in FIG. 17, a substantially columnar support shaft 52 is provided inside the casing 46 of the operating lever device 5. Sliding members 48a and 48b are disposed between the casing 46 and support shaft 52. The sliding members 48a and 48b cover part of the outer peripheral surface 52e of the support member 52.

The support shaft 52 is a longitudinally rotating shaft that is caused to rotate when the operating lever 6 is tilted along the longitudinal direction components F and B. The support shaft 52 is provided to the casing 46 while allowed to rotate above a center axis 52a.

One end of a piston 74 rests against one end face of the support shaft 52 via a sliding member 48c. The piston 74 is slidably housed in a cylinder 75. The cylinder 75 is mounted on one side of the casing 46.

The other end of the piston 74 faces a hydraulic chamber 75a inside the cylinder 75. The hydraulic chamber 75a communicates with a duct 73. The duct 73 further communicates with a duct 70. The duct 70 is connected to the discharge port of an operating lever pump 22.

Pressure oil is thereby fed to the hydraulic chamber 75a of the cylinder 75 via the ducts 70 and 73 when the engine 32 is started and the pressure oil is discharged from the operating lever pump 22 in a corresponding manner. Pressure is therefore applied by the pressure oil to the end of the piston 74 facing the hydraulic chamber 75a, and pushing pressure is exerted to the left in the drawing. A sliding member 48c is pushed by this pushing pressure against a support shaft 52. Sliding resistance is thus produced between the sliding surface 48d of the sliding member 48c and the outer peripheral surface 52e of the support shaft 52, which is in contact with the sliding surface 48d. A holding force for holding the operating lever 6 in the tilted position is thus generated. The pushing pressure from the piston 74, the sliding resistance between the sliding member 48c and the support shaft 52, and the holding force of the aforementioned operating lever 6 vary according to the magnitude of the pressure inside the hydraulic chamber 75a.

The hydraulic circuit of the operating lever device 5 is the same as in FIG. 8(b).

Operation of the lever hold canceling device will now be described.

The operating lever pump 22 is actuated when the engine 32 is started. Pressure oil is therefore discharged from the operating lever pump 22 and fed to the hydraulic chamber 75a of the cylinder 75 via the ducts 70 and 73. As a result, pressure is applied by the pressure oil to the end of the piston 74 facing the hydraulic chamber 75a, and pushing pressure is exerted to the left in the drawing. The sliding member 48c is pushed by this pushing pressure against the support shaft 52. Sliding resistance is thus produced between the sliding surface 48d of the sliding member 48c and the outer peripheral surface 52e of the support shaft 52, which is in contact with the sliding surface 48d.

Tilting the operating lever 6 causes the support shaft 52 to rotate about the center axis 52a by the amount of rotation proportional to the longitudinal direction components F and B of the tilting direction. In addition, the support shaft 53 rotates by the amount of rotation proportional to the transverse direction components L and R of the tilting direction.

Let us assume that the operator releases the operating lever 6 at this point. The support shaft 52 will stop in the position occupied at the moment of release because the frictional force of the sliding members 48a, 48b, and 48c is exerted on the opposite side from the rotational return force of the operating lever 6. Meanwhile, the support shaft 53 is rotated by the rotational return force of the operating lever 6 the moment the operating lever 6 is released.

For this reason, the longitudinal direction components F and B of the tilting direction remain in the tilted positions achieved at the time of release, and the transverse direction components L and R of the tilting direction return to the neutral position when the operating lever 6 is released. The pistons corresponding to the longitudinal direction components F and B will therefore remain displaced, and the hydraulic signal output will be preserved. For the transverse direction components L and R, on the other hand, the piston displacement will return to zero, bringing the hydraulic signal output to zero as well.

The pressure inside the hydraulic chamber 75a of the cylinder 75 is determined in accordance with the set relief pressure of the relief valve 72. The magnitude of the pressure inside the hydraulic chamber 75a is thereby allowed to vary in accordance with the set relief pressure of the relief valve 72, making it possible to vary the pushing pressure exerted by the piston 74, the sliding resistance, and the holding force of the operating lever 6 in a corresponding manner.

When the engine 32 is stopped, the pressure oil is no longer discharged from the operating lever pump 22, which serves as a drive source for the engine 32. Consequently, the pressure oil is no longer fed to the hydraulic chamber 75a of the cylinder 75, and the pressure inside the hydraulic chamber 75a decreases. The piston 74 thus becomes incapable of generating a pushing pressure. The state in which the sliding member 48c is pressed against the support shaft 52 is therefore canceled. This results in a lower sliding resistance between the sliding surface 48d of the sliding member 48c and the outer peripheral surface 52e of the support shaft 52 in contact with the sliding surface 48d. In other words, there is a reduction in the frictional force acting against the rotational return force of the operating lever 6. The frictional force applied to the operating lever 6 is thus less than the rotational return force applied to the same operating lever 6, and the support shaft 52 is returned to the original rotating position. Specifically, the operating lever 6 returns to the neutral position from the tilted position. The holding force of the operating lever 6 is thus released. For the longitudinal direction components F and B, the piston displacement thus will return to zero, bringing the hydraulic signal output to zero as well.

If the engine 32 is stopped and restarted while the operating lever 6 is kept in the tilted position in this manner, the operating lever 6 automatically returns to the neutral position, and a state in which the hydraulic signal is reset to zero is established. The vehicle is thereby prevented from being jolted when the engine 32 is restarted. In other words, it is possible to prevent situations in which the vehicle is jolted in the direction of travel in accordance with the direction in which the operating lever was tilted when the engine 32 was previously stopped.

In addition, the vehicle is much easier to operate because there is no need for the operator to manually return the operating lever 6 to the neutral position when the engine 32 is restarted.

In the structural example depicted in FIG. 17, the sliding member 48c is interposed between the piston 74 and the support shaft 52. An alternative is to dispense with the interposed sliding member 48c and to apply the pressure from the support shaft 52 directly to the piston 74. In this arrangement, sliding resistance is generated between the end face of the piston 74 and the outer peripheral surface 52e of the support shaft 52 in contact with this end face. In this case as well, the pushing pressure from the piston 74, the sliding resistance between the piston 74 and the support shaft 52, and the holding force of the operating lever 6 vary according to the magnitude of the pressure inside the hydraulic chamber 75a.

A second example of a lever hold canceling device obtained by the partial modification of the device depicted in FIG. 17 will now be described with reference to FIG. 18.

For the sake of convenience, the same structural elements as in FIG. 17 are assumed to perform the same functions and are omitted from the description that follows.

Figure 18:
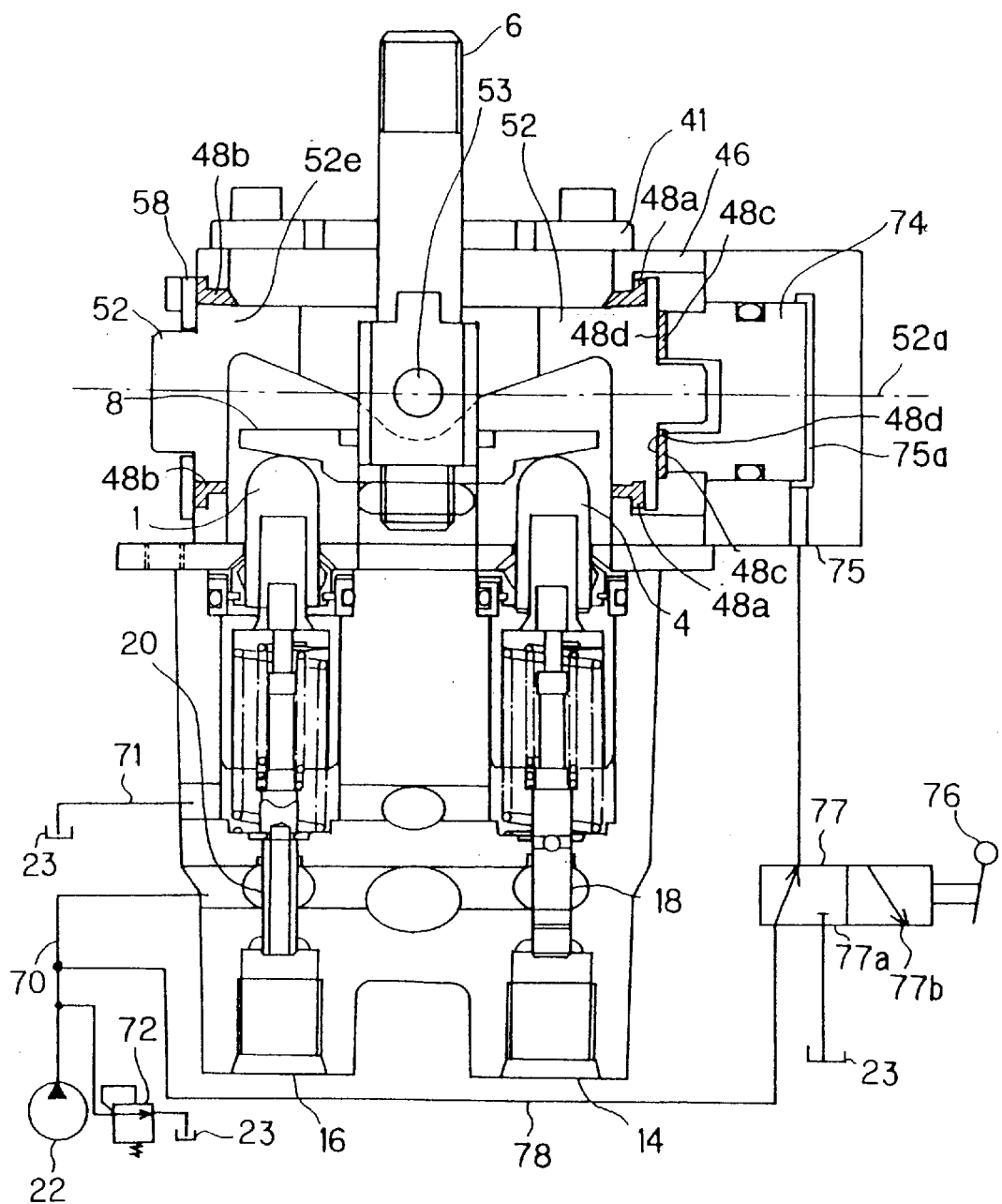
FIG. 18 is a diagram depicting the structure of a second example of the lever unlocking device.

The hydraulic chamber 75a in the cylinder 75 communicates with a duct 78, as shown in FIG. 18. The duct 78 is connected to the discharge port of the operating lever pump 22 via a duct 70.

A directional control valve 77 is provided to the duct 78. The position of the directional control valve 77 can be switched by operating a hold canceling lever 76. Switching the directional control valve 77 to the valve position 77a (lock position 77a) on the left side of the drawing causes the pressure oil discharged from the operating lever pump 22 to enter the hydraulic chamber 75a of the cylinder 75 through the directional control valve 77. When the directional control valve 77 is switched to the valve position 77b (unlock position 77b) on the right side of the drawing, the pressure oil discharged from the operating lever pump 22 is blocked by the directional control valve 77 and is not fed any longer to the hydraulic chamber 75a of the cylinder 75.

Operation of the lever hold canceling device will now be described.

The operating lever pump 22 is actuated when the engine 32 is started. At this point, the hold canceling lever 76 is actuated, and the directional control valve 77 is switched to the lock position 77a on the left side of the drawing, whereupon the pressure oil discharged from the operating lever pump 22 is fed to the hydraulic chamber 75a of the cylinder 75 through the directional control valve 77. Pushing pressure is therefore generated by the piston 74, and the tilted position achieved at the time of release is preserved for the longitudinal direction components F and B of the direction in which the operating lever 6 is tilted. The pistons corresponding to the longitudinal direction components F and B will therefore remain displaced, and the hydraulic signal output will be preserved. For the transverse direction components L and R, on the other hand, the piston displacement will return to zero, bringing the hydraulic signal output to zero as well.

When the hold canceling lever 76 is actuated and the directional control valve 77 is switched to the unlock position 77b on the right side of the drawing, the pressure oil discharged from the operating lever pump 22 is blocked by the directional control valve 77 and is not fed any longer to the hydraulic chamber 75a of the cylinder 75. The piston 74 therefore stops generating pushing pressure, and the operating lever 6 is returned from the tilted position to the neutral position for the longitudinal direction components F and B of the tilting direction at the time of release. In other words, the holding force of the operating lever 6 is canceled. The piston displacement for the longitudinal direction components F and B will thereby be returned to zero, bringing the hydraulic signal output to zero as well.

According to the structural example depicted in FIG. 18, the holding function can thus be canceled by the operation of the hold canceling lever 76 even when the engine 32 is in an operating state. Consequently, the holding function can be canceled in accordance with the working state even when the engine is running.

When the engine 32 is stopped, the pressure oil is no longer discharged from the operating lever pump 22, which serves as a drive source for the engine 32. Consequently, the pressure oil is no longer fed to the hydraulic chamber 75a of the cylinder 75, and the pressure inside the hydraulic chamber 75a decreases irrespective of the switching position of the directional control valve 77. The piston 74 thus becomes incapable of generating a pushing pressure. For this reason, the operating lever 6 returns to the neutral position from the tilted position for the longitudinal direction components F and B of the tilting direction at the time of release. In other words, the holding force of the operating lever 6 is canceled, and the hydraulic signal output becomes zero.

The result is that, as in the structural example in FIG. 17, the operating lever 6 is automatically returned to the neutral position and the vehicle is prevented from being jolted when the engine 32 is restarted. In addition, the vehicle is much easier to operate because there is no need for the operator to manually return the operating lever 6 to the neutral position when the engine 32 is restarted.

The holding force of the operating lever 6 should be kept constant to provide better control feedback for the operator. In practice, however, the holding force of the operating lever 6 varies with the load on the engine 32, causing the operator to experience discomfort when receiving control feedback.

Specifically, the flow rate of the pressure oil discharged from the operating lever pump 22 increases when the load on the engine 32 increases, and the engine 32 is rotated at a higher rotational speed. The actual relief pressure in the relief valve 72 increases in response to this. This causes an increase in the pressure inside the ducts 70 and 78 in communication with the hydraulic chamber 75a of the cylinder 75, and enhances the pushing pressure produced by the piston 74. The holding force of the operating lever 6 is thereby increased, alerting the operator to a stiffer response from the operating lever 6. Such variations in the holding force of the operating lever 6 cannot be dealt with in the case of the structural examples depicted in FIGS. 17 and 18.

Following is a description of a structural example of a lever hold canceling device that allows variations in the holding force of the operating lever 6 to be suppressed and the holding force to be kept constant irrespective of engine load.

A third example of the lever hold canceling device obtained by the partial modification of the device depicted in FIG. 17 will now be described with reference to FIG. 19. For the sake of convenience, the same structural elements as in FIG. 17 are assumed to perform the same functions and are omitted from the description that follows.

Figure 19:
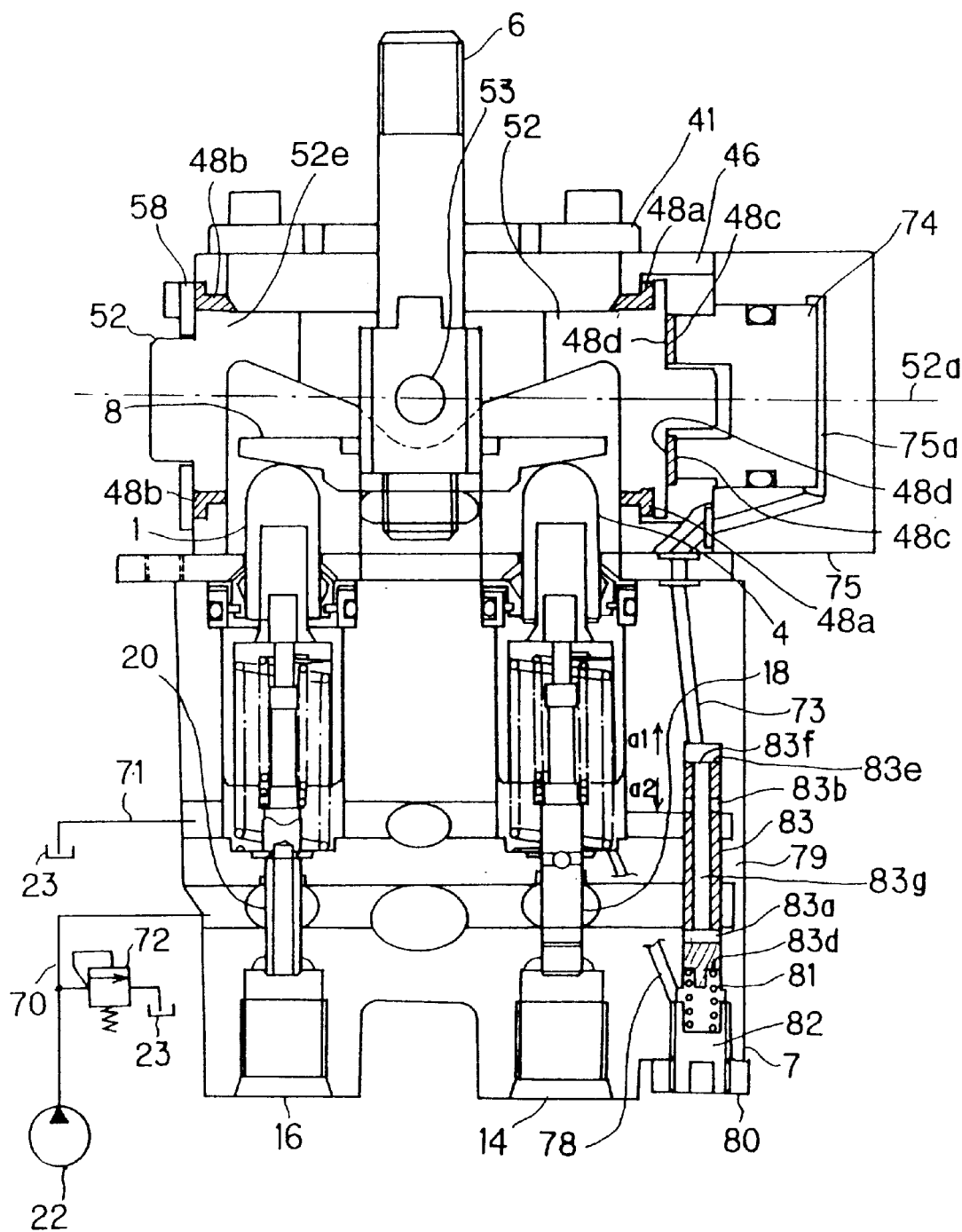
FIG. 19 is a diagram depicting the structure of a third example of the lever unlocking device.

A pressure regulator 79 is disposed between the duct 70 and duct 73, as shown in FIG. 19. The pressure regulator 79 is designed to reduce the pressure of the pressure oil inputted to the duct 70 to a set level, to output the result to the duct 73, and to keep the lever holding force at a constant level.

The pressure regulator 79 is provided to the device unit 7 of the lever device 5. The pressure regulator 79 comprises a spool 83, a spring 81 for applying spring force on the spool 83, an adjustment bolt 82 for setting the spring force of the spring 81, and a locknut 80 for fixing the adjustment bolt 82 in the device unit 7.

The spool 83 is provided with a longitudinal hydraulic passage 83g. The hydraulic passage 83g communicates with the duct 73 via an opening 83f formed in an end face 83e of the spool 83. Openings 83a and 83b are formed on the other side of the spool 83. The hydraulic passage 83g and the openings 83a and 83b communicate with each other. The opening 83a is formed at a position corresponding to the duct 70, and the opening 83b is formed at a position corresponding to the duct 71.

One end of the spring 81 is brought into contact with the other end face 83d of the spool 83. The other end of the spring 81 is kept in contact with the adjustment bolt 82. The other end face 83d of the spool 83 faces the duct 78. The duct 78 communicates with the duct 71. The adjustment bolt 82 is screwed into the device unit 7. The head of the adjustment bolt 82 is fixed to the device unit 7 by the locknut 80.

Operation of the pressure regulator 79 will now be described.

The operating lever pump 22 is actuated when the engine 32 is started. The pressure oil discharged from the operating lever pump 22 is therefore fed to the duct 73 via the pressure regulator 79.

The spring force applied by the spring 81 to the spool 83 can be varied when the head of the adjustment bolt 82 is rotated to adjust the screw-in position with respect to the device unit 7. The adjustment bolt 82 is fixed to the device unit 7 by the locknut 80 when the spring force exerted by the adjustment bolt 82 is set to the desired level. The setting of the holding force of the operating lever 6 is thus completed.

Let us now assume that the spring force of the spring 81 is greater than the force exerted by the pressure oil inside the duct 73. At this time the spool 83 moves in the direction a1 in the drawing. The opening 83a in the spool 83 is therefore connected to the duct 70, and the pressure oil discharged from the operating lever pump 22 is inputted to the duct 73 via the duct 70, opening 83a, internal passage 83g, and opening 83f. This raises the pressure of the pressure oil in the duct 73.

As a result, the pressure exerted by the pressure oil in the duct 73 exceeds the spring force of the spring 81. At this time the spool 83 moves in the direction a2 in the drawing.

The opening 83b in the spool 83 is therefore connected to the duct 71, and the pressure oil in the duct 73 is discharged into a tank 23 via the opening 83f, internal passage 83g, opening 83b, and duct 71. This lowers the pressure of the pressure oil in the duct 73.

The spool 83 repeatedly moves in the direction a1 or a2 and stops when the spring force of the spring 81 is the same as the pressure exerted by the pressure oil in the duct 73. At this time, the pushing pressure produced by the piston 74 is set to a level that corresponds to the spring force of the spring 81.

It is thus possible to set the pushing pressure produced by the piston 74 to a constant level in accordance with the spring force of the spring 81 irrespective of the load on the engine 32, and to keep the holding force of the operating lever 6 at a constant level.

A fourth example of the lever hold canceling device obtained by the partial modification of the device depicted in FIG. 18 will now be described with reference to FIG. 20. For the sake of convenience, the same structural elements as in FIG. 18 are assumed to perform the same functions and are omitted from the description that follows.

Figure 20:
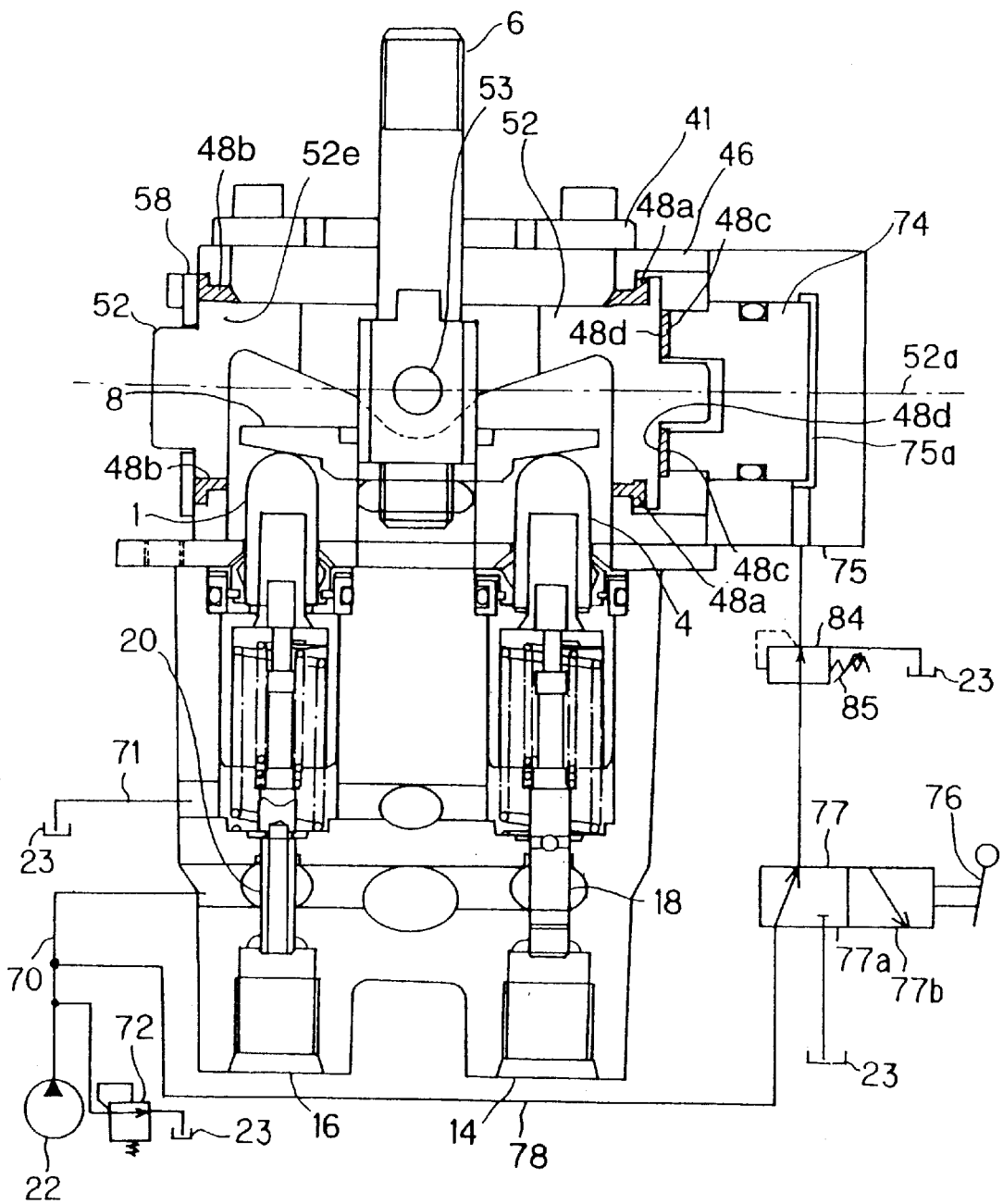
FIG. 20 is a diagram depicting the structure of a fourth example of the lever unlocking device.

Similar to the third example in FIG. 19, the fourth example in FIG. 20 allows the holding force of the operating lever 6 to be kept constant irrespective of the load on the engine 32.

A pressure regulator 84 is provided to a duct 78 between a directional control valve 77 and the hydraulic chamber 75a of the cylinder 75, as shown in FIG. 20. The pressure regulator 84 is designed to reduce the pressure of the pressure oil passing through the directional control valve 77 to a preset level, to output the result to the hydraulic chamber 75a, and to keep the lever holding force at a constant level. The set pressure of the pressure regulator 84 can be adjusted by varying the setting spring force of a spring 85.

Similar to the third example in FIG. 19, the pushing pressure produced by the piston 74 can be kept at a constant level proportional to the spring force set by the pressure regulator 84, and the holding force of the operating lever 6 can be kept constant irrespective of the load on the engine 32.

The third example depicted in FIG. 19 and the fourth example depicted in FIG. 20 both entail providing a pressure regulator 79 or pressure regulator 84 to the duct 73 or duct 78 in communication with the piston 74, and keeping the lever holding force at a constant level. It is also possible to provide the same holding force adjustment mechanism on the side of the piston 74 and to keep the lever holding force at a constant level.

A fifth example of the lever hold canceling device obtained by the partial modification of the device depicted in FIG. 17 will now be described with reference to FIG. 21. For the sake of convenience, the same structural elements as in FIG. 17 are assumed to perform the same functions and are omitted from the description that follows.

Figure 21:
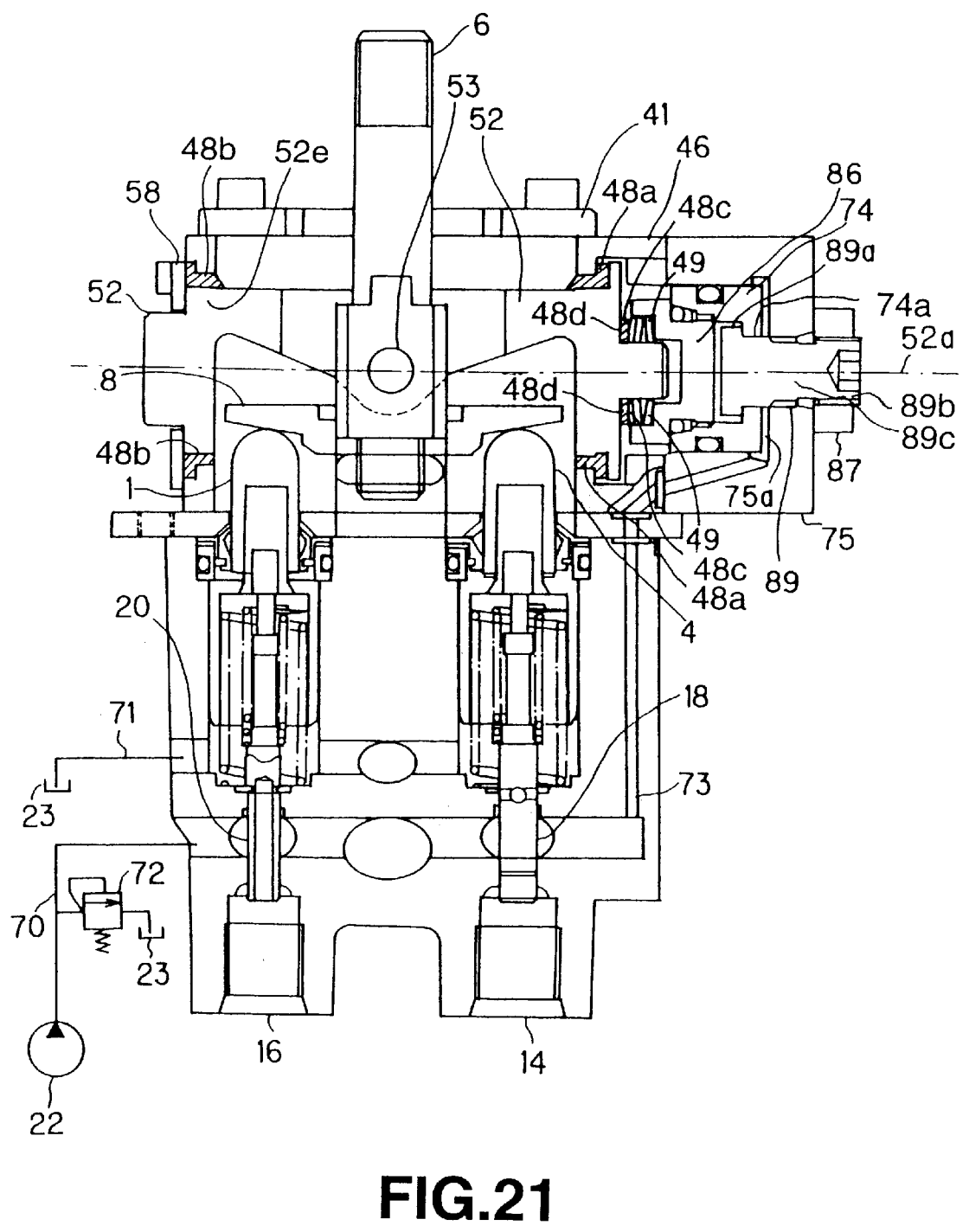

Similar to the third example in FIG. 19, the fifth example in FIG. 21 allows the holding force of the operating lever 6 to be kept constant irrespective of the load on the engine 32.

One end of a spring 49 rests against one end face of a support shaft 52 via a sliding member 48c, as shown in FIG. 21. Another type of spring may be used instead of the disk spring 49. A spring force corresponding to the displacement position is produced when the spring 49 is displaced. The pushing pressure of the sliding member 48c against the support shaft 52 varies with the spring force of the spring 49.

The sliding resistance between the sliding member 48c and the support shaft 52 varies with the pushing pressure of the sliding member 48c on the support shaft 52.

The other end of the spring 49 rests against an adjustment member 86 for adjusting the spring force. The adjustment member 86 is fixedly screwed into the piston 74 and integrated with this piston 74. The piston 74 is slidably accommodated in a cylinder 75. The cylinder 75 is mounted on one side of a casing 46. The other end of the piston 74 faces a hydraulic chamber 75a inside the cylinder 75.

The piston 74 moves to the left in the drawing when the pressure of the pressure oil in the hydraulic chamber 75a is applied to the piston 74. The movement position of the piston 74 is defined in accordance with the screw-in position of an adjustment bolt 89.

The adjustment bolt 89 is screwed into the cylinder 75. The head 89b of the adjustment bolt 89 is fixed to the cylinder 75 by a locknut 87.

A stopper 89a whose diameter is greater than the shaft diameter of the adjustment bolt 89 is formed on the opposite side from the head 89b of the adjustment bolt 89. The piston 74 is provided with an opening 74a whose inside diameter corresponds to the diameter of the shaft 89c of the adjustment bolt 89. The shaft 89c of the adjustment bolt 89 is inserted into the piston opening 74a to allow the piston 74 to slidably move in relation to the adjustment bolt 89. The movement position of the piston 74 is defined such that the piston 74 can press against the stopper 89a of the adjustment bolt 89.

Operation of the holding force adjustment mechanism will now be described.

The operating lever pump 22 is actuated when the engine 32 is started. The pressure oil discharged from the operating lever pump 22 is therefore fed to the hydraulic chamber 75a of the cylinder 75 via the ducts 70 and 73.

Here, the control position of the piston 74 defined by the stopper 89a of the adjustment bolt 89 is varied by rotating the head 89b of the adjustment bolt 89 and adjusting the screw-in position in relation to the cylinder 75. The adjustment bolt 89 is fixed to the cylinder 75 by the locknut 87 when the piston control position is set to the desired level by adjusting the adjustment bolt 89. The setting of the holding force of the operating lever 6 is thus completed.

Let us now assume that the force exerted by the pressure oil inside the hydraulic chamber 75a is greater than the spring force of the spring 49. At this time the piston 74 moves to the left in the drawing. The piston 74 moves integrally with the adjustment member 86. The movement of the adjustment member 86 displaces the spring 49.

The ultimate movement position of the piston 74 is defined by the stopper 89a of the adjustment bolt 89. Consequently, the spring 49 is ultimately displaced to a position corresponding to the piston control position. The spring 49 generates a spring force that corresponds to the ultimate displacement position. Sliding resistance is produced by this spring force between the sliding member 48 and the support shaft 52, and a holding force for holding the operating lever 6 is produced by this sliding resistance.

As a result, a holding force corresponding to the screw-in position of the adjustment bolt 89 is obtained for the operating lever 6. At this time, the operating lever 6 is subjected to a constant holding force proportional to the spring force of the spring 49 even when the pressure inside the hydraulic chamber 75a varies, provided the force exerted by the pressure oil inside the hydraulic chamber 75a is greater than the spring force of the spring 49. In other words, the holding force of the operating lever 6 can be kept constant irrespective of the load on the engine 32.

Figure 22:
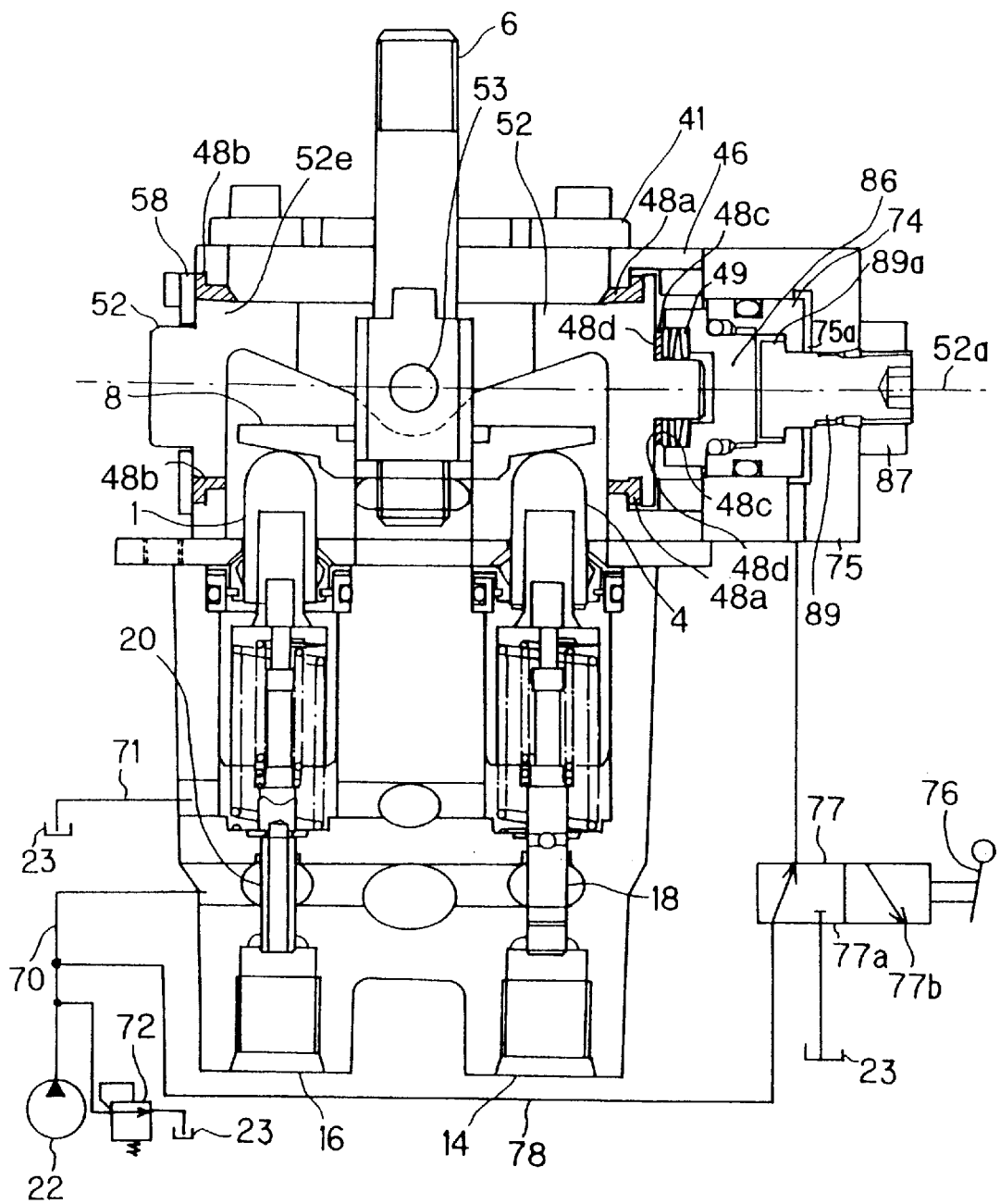
FIG. 22 is a diagram depicting the structure of a sixth example of the lever unlocking device.

FIG. 22 depicts a sixth example of a lever hold canceling device provided with a directional control valve 77 in the same manner as in the second example in FIG. 18. In the operating lever device 5 depicted in FIG. 22, the holding force of the operating lever 6 is canceled by the directional control valve 77. It is also possible, however, to cancel the holding force of the operating lever 6 by adjusting the adjustment bolt 89 such that the holding force of the operating lever is brought to zero.

In the sixth example in FIG. 22, a holding force adjustment mechanism comprising a spring 49, an adjustment member 86, an adjustment bolt 89, and the like is provided on the side of the piston 74 in the same manner as in the fifth example in FIG. 21.

According to the sixth example in FIG. 22, the holding function can be canceled in accordance with the working state even when the engine is running, similar to the second example in FIG. 18. In addition, the operating lever 6 is subjected to a constant holding force irrespective of engine load, provided the force exerted by the pressure oil inside the hydraulic chamber 75a is greater than the spring force of the spring 49, as in the fifth example in FIG. 21.

Construction equipment is provided with safety lock levers in order to prevent processing machinery or running gear from malfunctioning due to an accidental tripping of an operating lever. For example, moving a safety lock lever to the locked side prevents running gear (left and right tracks 36 and 38) from being actuated with the operating lever 6.

Following is a description of a seventh example, which is provided with a hold canceling lever doubling as a safety lock lever.

Figure 23:
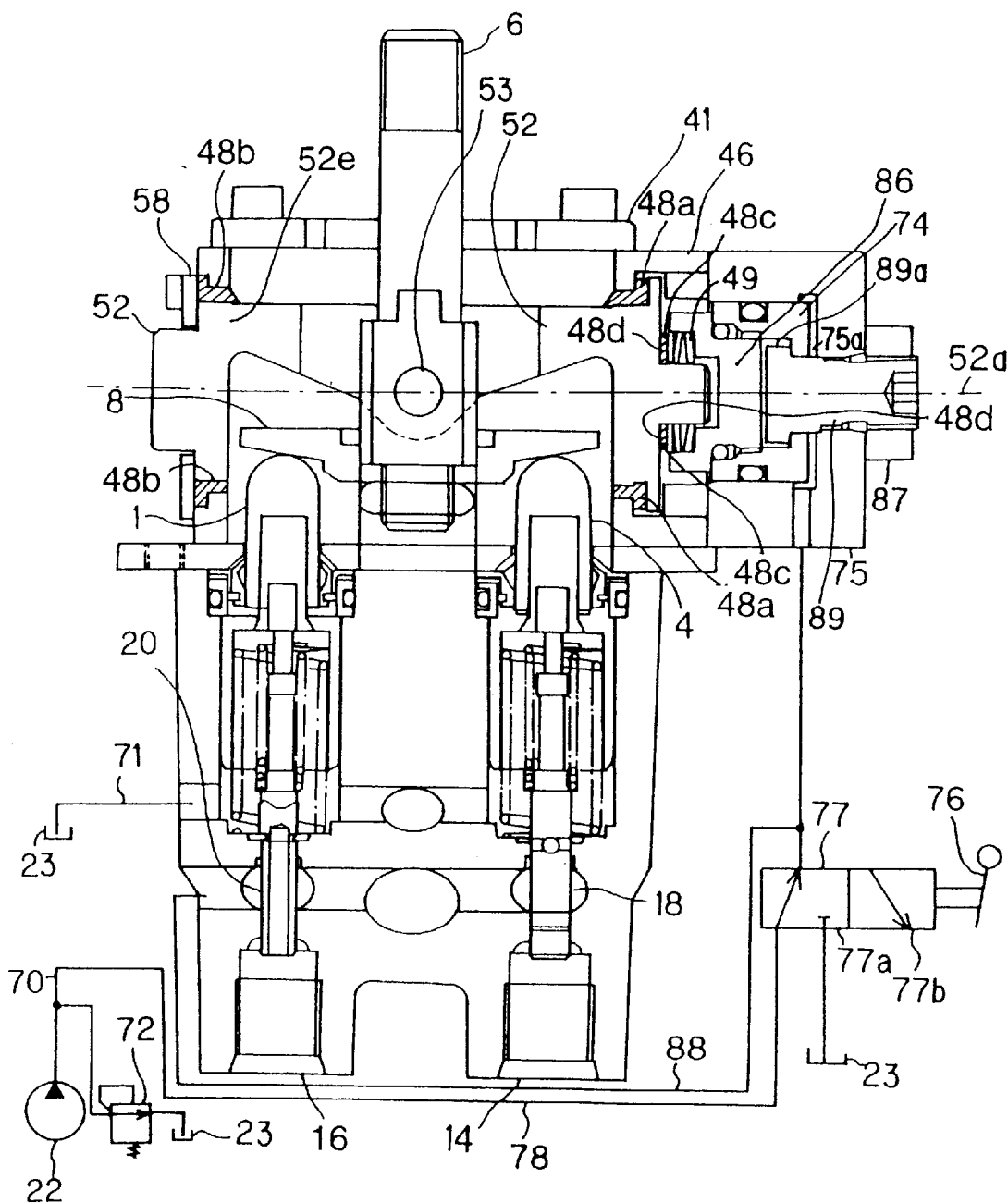
FIG. 23 is a diagram depicting the structure of a seventh example of the lever unlocking device.

FIG. 23 depicts the seventh example, which is obtained by partially modifying the duct structure of the sixth example in FIG. 22.

The hydraulic chamber 75a of the cylinder 75 communicates with the discharge port of the operating lever pump 22 via the ducts 78 and 70, as shown in FIG. 23. The duct 78 is provided with a directional control valve 77. Unlike in FIG. 22, the inlet ports of the pressure regulators 18 to 21 communicate with the discharge port of the operating lever pump 22 via the duct 88, directional control valve 77, duct 78, and duct 70.

Operation of the lever hold canceling device will now be described.

When the hold canceling lever 76 is operated and the directional control valve 77 is switched to the lock position 77a on the left side of the drawing, the pressure oil discharged from the operating lever pump 22 is fed to the hydraulic chamber 75a of the cylinder 75 through the directional control valve 77. At the same time, the pressure oil discharged from the operating lever pump 22 is fed to the inlet ports of the pressure regulators 18 to 21 through the directional control valve 77. In other words, a holding force is applied to the operating lever 6, and the safety lock lever is moved to the unlocked side. At this time, the running gear (left and right tracks 36 and 38) are actuated in accordance with the operation of the operating lever 6.

When the hold canceling lever 76 is operated and the directional control valve 77 is switched to the unlock position 77b on the right side of the drawing, the pressure oil discharged from the operating lever pump 22 is blocked by the directional control valve 77 and is no longer fed to the hydraulic chamber 75a of the cylinder 75. At the same time, the pressure oil discharged from the operating lever pump 22 is blocked by the directional control valve 77 and is no longer fed to the inlet ports of the pressure regulators 18 to 21. In other words, the holding force applied to the operating lever 6 is canceled. At the same time, the safety lock lever is moved to the locked side. At this time, the running gear (left and right tracks 36 and 38) cannot be actuated with the operating lever 6.

Thus, the seventh example depicted in FIG. 23 allows the hold canceling lever 76 to double as a safety lock lever and makes it possible to reduce the number of parts.

The lever hold canceling devices depicted in FIGS. 17 to 23 are configured such that a holding force can be applied to or removed from the operating lever 6 in accordance with a hydraulic signal. The present invention also allows a holding force to be applied to or removed from the operating lever 6 in accordance with an electrical signal.

What is claimed is:

1. An operating lever device, comprising:
   an operating lever tiltable in an arbitrary longitudinal or transverse tilting direction in two dimensions;
   a longitudinally rotating shaft rotating in accordance with the tilting of the operating lever along a longitudinal direction component;
   a transversely rotating shaft rotating in accordance with the tilting of the operating lever along a transverse direction component; and
   drive signal generation means for generating a drive signal in accordance with a direction and an amount of tilt of the operation lever, and outputting the result to two actuators, wherein the operating lever device further comprises:
   holding means for holding the operating lever in a tilted position of a directional component selected from the longitudinal and transverse direction components by generating a sliding resistance in the longitudinally rotating shaft or the transversely rotating shaft when the operating lever is tilted.

2. The operating lever device as defined in claim 1, further comprising neutral position signal generation means for generating a signal indicating that the operating lever is in a neutral position when at least one directional component selected from the longitudinal and transverse direction components of the operating lever is in the neutral position.

3. The operating lever device as defined in claim 2, wherein the neutral position signal generation means is means for varying an operating force of the operating lever.

4. The operating lever device as defined in claim 2, wherein the neutral position signal generation means generates the neutral position signal when both the longitudinal and transverse direction components of the operating lever are in the neutral position, and comprises means for allowing a drive source to be started in accordance with the neutral position signal.

5. The operating lever device as defined in claim 1, further comprising hold canceling means for canceling a holding state imposed by the holding means.

6. The operating lever device as defined in claim 5, wherein the hold canceling means cancels a holding force acting on the operating lever in accordance with stoppage of the drive source for the two actuators.

7. The operating lever device as defined in claim 1, further comprising means, when the operating lever has been tilted, for holding the operating lever in the titled position of a directional component selected from the longitudinal and transverse direction components by the holding means and returning the tilted position of other directional component to the neutral position.

8. The operating lever device as defined in claim 1, further comprising holding force adjustment means for adjusting a magnitude of a holding force acting on the operating lever.

9. The operating lever device as defined in claim 1, where the two actuators are two traction actuators, and the drive signal generation means is drive signal generation means for generating the drive signal to propel a vehicle at a travel speed proportional to the amount of tilt of the operating lever in a direction of travel corresponding to the tilting direction of the operating lever, and outputting the generated drive signal to the two traction actuators.

* * * * *